(12) United States Patent
Lee et al.

(10) Patent No.: US 12,382,194 B2
(45) Date of Patent: Aug. 5, 2025

(54) IMAGE SENSOR CORRECTING CROSSTALK, OPERATING METHOD OF IMAGE SENSOR, AND ELECTRONIC DEVICE INCLUDING IMAGE SENSOR

(71) Applicant: SAMSUNG ELECTRONICS CO., LTD., Suwon-si (KR)

(72) Inventors: Sangwoo Lee, Suwon-si (KR); Eun-Ji Yong, Suwon-si (KR); Dongoh Kim, Suwon-si (KR); Sungsu Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 273 days.

(21) Appl. No.: 18/121,804

(22) Filed: Mar. 15, 2023

(65) Prior Publication Data

US 2023/0412939 A1    Dec. 21, 2023

(30) Foreign Application Priority Data

Jun. 20, 2022   (KR) .................. 10-2022-0075035
Sep. 6, 2022    (KR) .................. 10-2022-0112541

(51) Int. Cl.
*H04N 25/62*       (2023.01)
*H04N 25/78*       (2023.01)

(52) U.S. Cl.
CPC ............. *H04N 25/62* (2023.01); *H04N 25/78* (2023.01)

(58) Field of Classification Search
CPC ........ H04N 25/62; H04N 25/78; H04N 23/12; H04N 23/81; H04N 23/843; H04N 25/134
See application file for complete search history.

(56) References Cited

U.S. PATENT DOCUMENTS

| 8,208,039 B2 | 6/2012 | Manabe |
| 8,805,063 B2 | 8/2014 | Park et al. |
| 8,957,990 B2 | 2/2015 | Seo et al. |
| 10,003,720 B2 * | 6/2018 | Yoshii .................. H04N 1/6005 |
| 10,469,779 B2 * | 11/2019 | Matsunaga ............ H04N 25/62 |
| 2001/0037160 A1 | 11/2001 | Kumata |
| 2009/0324020 A1 * | 12/2009 | Hasebe .................. G06V 10/76 |
|  |  | 382/115 |
| 2021/0006755 A1 | 1/2021 | Kim et al. |
| 2021/0211615 A1 | 7/2021 | Kim et al. |
| 2021/0217134 A1 | 7/2021 | Okamura |
| 2021/0383555 A1 * | 12/2021 | Shin ..................... H04N 25/134 |
| 2022/0005168 A1 * | 1/2022 | Kim ......................... G06T 5/73 |
| 2022/0124264 A1 | 4/2022 | Jang et al. |

FOREIGN PATENT DOCUMENTS

| KR | 2001-0095057 A | 11/2001 |
| KR | 2002-0014535 A | 2/2002 |
| KR | 10-2055253 B1 | 12/2019 |
| KR | 10-2021-0130972 A | 11/2021 |

* cited by examiner

*Primary Examiner* — Gevell V Selby
(74) *Attorney, Agent, or Firm* — Sughrue Mion, PLLC

(57) ABSTRACT

An image sensor includes a pixel unit including a plurality of pixels, and configured to generate an analog signal using the plurality of pixels, a data converter configured to receive the analog signal and convert the analog signal into a digital signal, and at least one processor configured to generate image data by performing crosstalk correction and remosaic on the digital signal, output the image data to an external device, receive image data information from the external device, determine a saturation ratio based on the image data information, and adjust settings of the remosaic based on the saturation ratio.

18 Claims, 14 Drawing Sheets

IMAGE SENSOR CORRECTING CROSSTALK, OPERATING METHOD OF IMAGE SENSOR, AND ELECTRONIC DEVICE INCLUDING IMAGE SENSOR

CROSS-REFERENCE TO RELATED APPLICATIONS

This application is based on and claims priority under 35 U.S.C. § 119 to Korean Patent Application No. 10-2022-0075035, filed on Jun. 20, 2022, and Korean Patent Application No. 10-2022-0112541, filed on Sep. 6, 2022, in the Korean Intellectual Property Office, the disclosures of which are incorporated herein by reference in their entireties.

BACKGROUND

1. Field

Example embodiments of the present disclosure relate to an electronic device, and more particularly, relate to an image sensor correcting crosstalk, an operating method of the image sensor, and an electronic device including the image sensor.

2. Description of Related Art

An image sensor may include a plurality of pixels and may generate image data using the plurality of pixels. The image data generated by the image sensor may include various noises and distortions. The image sensor may perform calibration for removing the noises and distortions from the image data and may output calibrated image data.

The noises and distortions of the image data may include crosstalk. The crosstalk may be caused when an incident light is irregularly sensed by the pixels of the image sensor or when a sensing result is leaked out between pixels. To correct the crosstalk, the image sensor may perform various calibrations.

When an image sensor detects an incident light, the crosstalk may occur between pixels. A related art camera module may use a method of compensating for the crosstalk by applying a gain and an offset to pixel values. However, when pixels are saturated by the backlight or bright environment, related art methods of compensating for the crosstalk do not appropriately address the issue. In particular, the backlight may occur in various cases, and it may not be possible to correct the crosstalk in the backlight environment with a related art algorithm.

Information disclosed in this Background section has already been known to or derived by the inventors before or during the process of achieving the embodiments of the present application, or is technical information acquired in the process of achieving the embodiments. Therefore, it may contain information that does not form the prior art that is already known to the public.

SUMMARY

One or more example embodiments provide an image sensor capable of correcting a crosstalk even when pixel values sensed by pixels of the image sensor are saturated, an operating method of the image sensor, and an electronic device including the image sensor.

Provided is a method of correcting the crosstalk in a backlight environment in terms of remosaic.

Additional aspects will be set forth in part in the description which follows and, in part, will be apparent from the description, or may be learned by practice of the presented embodiments.

According to an aspect of an example embodiment, an image sensor may include a pixel unit including a plurality of pixels, and configured to generate an analog signal using the plurality of pixels, a data converter configured to receive the analog signal and convert the analog signal into a digital signal, and at least one processor configured to generate image data by performing crosstalk correction and remosaic on the digital signal, output the image data to an external device, receive image data information from the external device, determine a saturation ratio based on the image data information, and adjust settings of the remosaic based on the saturation ratio.

According to an aspect of an example embodiment, an operating method of an image sensor including a plurality of pixels may include receiving, at the image sensor, image data information from an external device, determining, at the image sensor, a saturation ratio of image data obtained by the image sensor from the image data information, adjusting, at the image sensor, remosaic settings based on the saturation ratio, and performing, at the image sensor, remosaic on the image data obtained by the image sensor based on the remosaic settings.

According to an aspect of an example embodiment, an electronic device may include an image sensor including a plurality of pixels, and at least one processor configured to generate image data information based on image data generated by the image sensor, and send the image data information to the image sensor, where the image sensor may be configured to determine a saturation ratio of the plurality of pixels from the image data information, correct a crosstalk of the plurality of pixels based on the saturation ratio in one of a first mode and a second mode, in the first mode, correct the crosstalk based on a gain and an offset, and in the second mode, correct the crosstalk based on the gain and the offset and by adjusting remosaic settings.

BRIEF DESCRIPTION OF DRAWINGS

The above and other aspects, features, and advantages of certain example embodiments of the present disclosure will be more apparent from the following description taken in conjunction with the accompanying drawings, in which.

DETAILED DESCRIPTION

Figure 1:
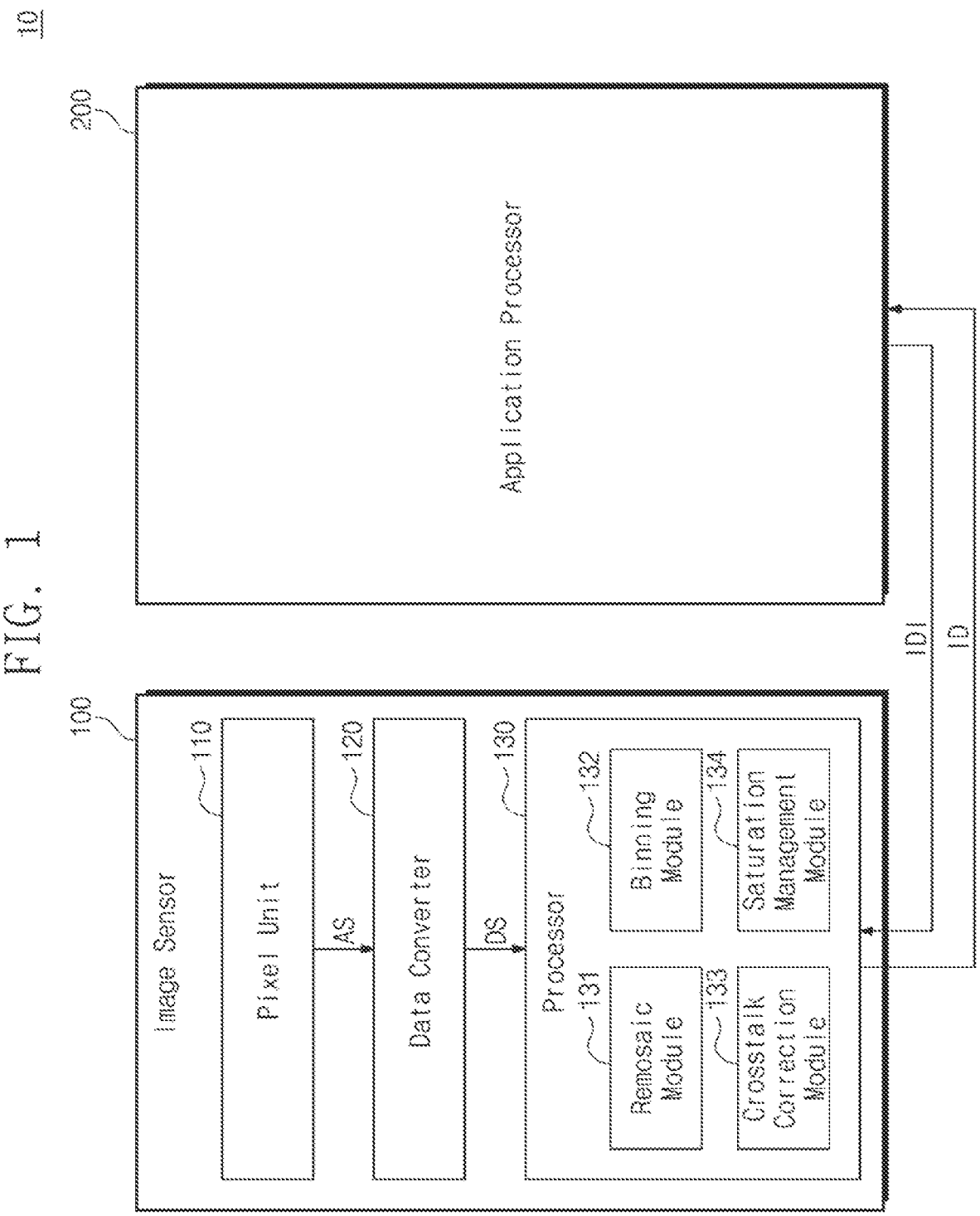
FIG. 1 is a diagram illustrating an electronic device according to an example embodiment of the present disclosure.

Below, embodiments of the present disclosure will be described in detail and clearly to such an extent that an ordinary one in the art easily implements the present disclosure. Below, the term "and/or" is interpreted as including any one of items listed with regard to the term, or a combination of some of the listed items.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

FIG. 1 is a diagram illustrating an electronic device 10 according to an example embodiment of the present disclosure. Referring to FIG. 1, the electronic device 10 may include an image sensor 100 and an application processor 200. In an example embodiment, the electronic device 10 may further include various peripheral devices such as a display device, a memory, a storage device, and a user interface.

The image sensor 100 may include a pixel unit 110, a data converter 120, and a processor 130. The pixel unit 110 may include a plurality of pixels. The pixel unit 110 may generate an analog signal AS using the plurality of pixels. The analog signal AS may include a plurality of signals whose levels (e.g., voltage levels or current levels) are different depending on the intensity of light incident onto the pixels of the pixel unit 110.

The data converter 120 may convert the analog signal AS generated by the pixel unit 110 into a digital signal DS. The data converter 120 may output the digital signal DS to the processor 130. The digital signal DS may include a plurality of digital values converted from the levels of the plurality of signals in the analog signal AS.

The processor 130 may receive the digital signal DS from the data converter 120. The processor 130 may perform calibration for removing noises and/or distortions from the digital signal DS and may generate image data ID. The processor 130 may output the image data ID to the application processor 200. For example, the processor 130 may output the image data ID to the application processor 200 based on the mobile industry processor interface (MIPI) C-PHY or D-PHY.

For example, the processor 130 may include a memory (e.g., a static random access memory) for storing the digital signal DS for the calibration. The memory may store the digital signal DS corresponding to pixels belonging to one or more rows from among the pixels of the pixel unit 110. The capacity of the memory may correspond to a unit of pixels necessary to perform the calibration.

The processor 130 may receive image data information IDI from the application processor 200. For example, the processor 130 may receive the image data information IDI from the application processor 200 through the MIPI C-PHY or D-PHY or inter-integrated circuit (I2C) interface. The image data information IDI may include information about the image data ID of a previous frame. The processor 130 may select a mode or scheme to perform the calibration based on the image data information IDI.

The processor 130 may include a remosaic module 131, a binning module 132, a crosstalk correction module 133, and a saturation management module 134. The processor 130 may selectively activate one of the remosaic module 131 and the binning module 132 depending on the brightness (or illuminance) corresponding to the digital values of the digital signal DS.

When the brightness (or illuminance) corresponding to the digital values of the digital signal DS is greater than or equal to a reference value, the processor 130 may activate the remosaic module 131. The remosaic module 131 may generate image data corresponding to a Bayer pattern from the digital signal DS corresponding to a pixel pattern of the pixel unit 110 (e.g., may generate intermediate image data to be processed to the image data ID). When the brightness (or illuminance) corresponding to the digital values of the digital signal DS is smaller than the reference value (e.g., a brightness reference value), the processor 130 may activate the binning module 132. The binning module 132 may generate the image data of the Bayer pattern by summing digital values belonging to the same channel (or the same color) from among the digital values of the digital signal DS corresponding to the pixel pattern of the pixel unit 110 (e.g., may generate the intermediate image data to be processed to the image data ID).

When the remosaic module 131 is activated, the crosstalk correction module 133 may be activated. The crosstalk correction module 133 may perform crosstalk correction by applying a gain and an offset to the digital signal DS or pixel values of the image data remosaiked by the remosaic module 131. For example, the crosstalk correction module 133 may store the gain and the offset in the form of a table and may perform the crosstalk correction with reference to the table.

When the remosaic module 131 is activated, the saturation management module 134 may be activated. The saturation management module 134 may calculate a saturation ratio indicating the degree by which the pixel values of the pixels of the pixel unit 110 (e.g., values of the digital signals of the digital signal DS) are saturated, based on the image data information IDI. The saturation management module 134 may adjust settings, which are necessary for the remosaic module 131 to perform remosaic, based on the saturation ratio. The saturation management module 134 may suppress the crosstalk caused in an environment where the pixel values of the pixels of the pixel unit 110 are saturated, by adjusting the remosaic settings.

An example where the image sensor 100 and the application processor 200 directly communicate with each other is illustrated in FIG. 1. However, this is for conveying an example embodiment of the present disclosure easily, and any other components that arbitrate or assist the transfer of the image data ID between the image sensor 100 and the application processor 200 may be provided.

Figure 2:
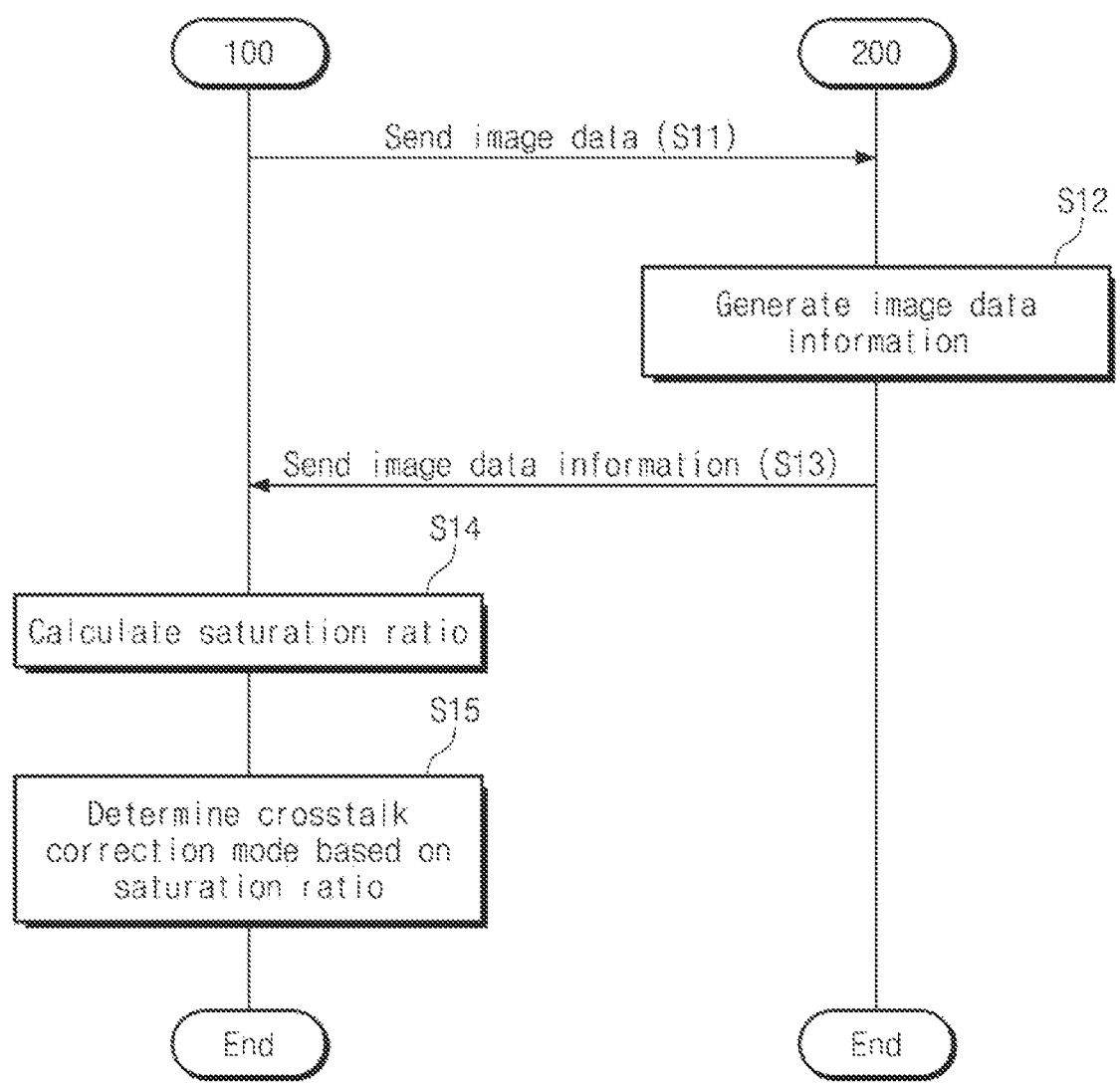
FIG. 2 is a diagram illustrating an example of an operating method of an electronic device of FIG. 1 according to an example embodiment of the present disclosure.

FIG. 2 is a diagram illustrating an example of an operating method of an electronic device 10 of FIG. 1 according to an example embodiment of the present disclosure. Referring to FIGS. 1 and 2, in operation S11, the image sensor 100 may send image data (e.g., the image data ID of a first frame) to the application processor 200. In operation S12, the application processor 200 may generate the image data information IDI from the received image data. In an example embodiment, the application processor 200 may display the received image data through a display device or may store the received image data.

In operation S13, the application processor 200 may send the image data information IDI to the image sensor 100. In operation S14, the processor 130 of the image sensor 100 may calculate a saturation ratio based on the image data information IDI. In operation S15, the processor 130 of the image sensor 100 may determine a crosstalk correction mode based on the saturation ratio. In an example embodiment, the image data information IDI may include a mean value(s) of pixel values or the number(s) of saturated pixels.

For example, when the saturation ratio (e.g., the saturation ratio of the image data ID of the first frame) is smaller than a reference value (e.g., a saturation reference value) or is "0", the processor 130 of the image sensor 100 may generate the image data ID (e.g., the image data ID of a second frame following the first frame) by correcting the crosstalk of the digital signal DS only using the crosstalk correction module 133. When the saturation ratio is greater than or equal to the reference value (e.g., the saturation reference value), the processor 130 of the image sensor 100 may generate the image data ID (e.g., image data of the second frame following the first frame) by correcting the crosstalk of the digital signal DS based on the crosstalk correction module 133 and additionally correcting the crosstalk by adjusting the remosaic settings of the remosaic module 131.

In an example embodiment, the crosstalk correction module 133 may perform the crosstalk correction on pixel values of pixels that are not saturated. The remosaic module 131 may perform the crosstalk correction (or suppression) on the entire area or a partial area of the pixel values of the digital signal DS. To select an area where the remosaic module 131 corrects (or suppresses) the crosstalk on a digital signal corresponding to pixels may be performed regardless of the saturation level or the saturation ratio.

Figure 3:
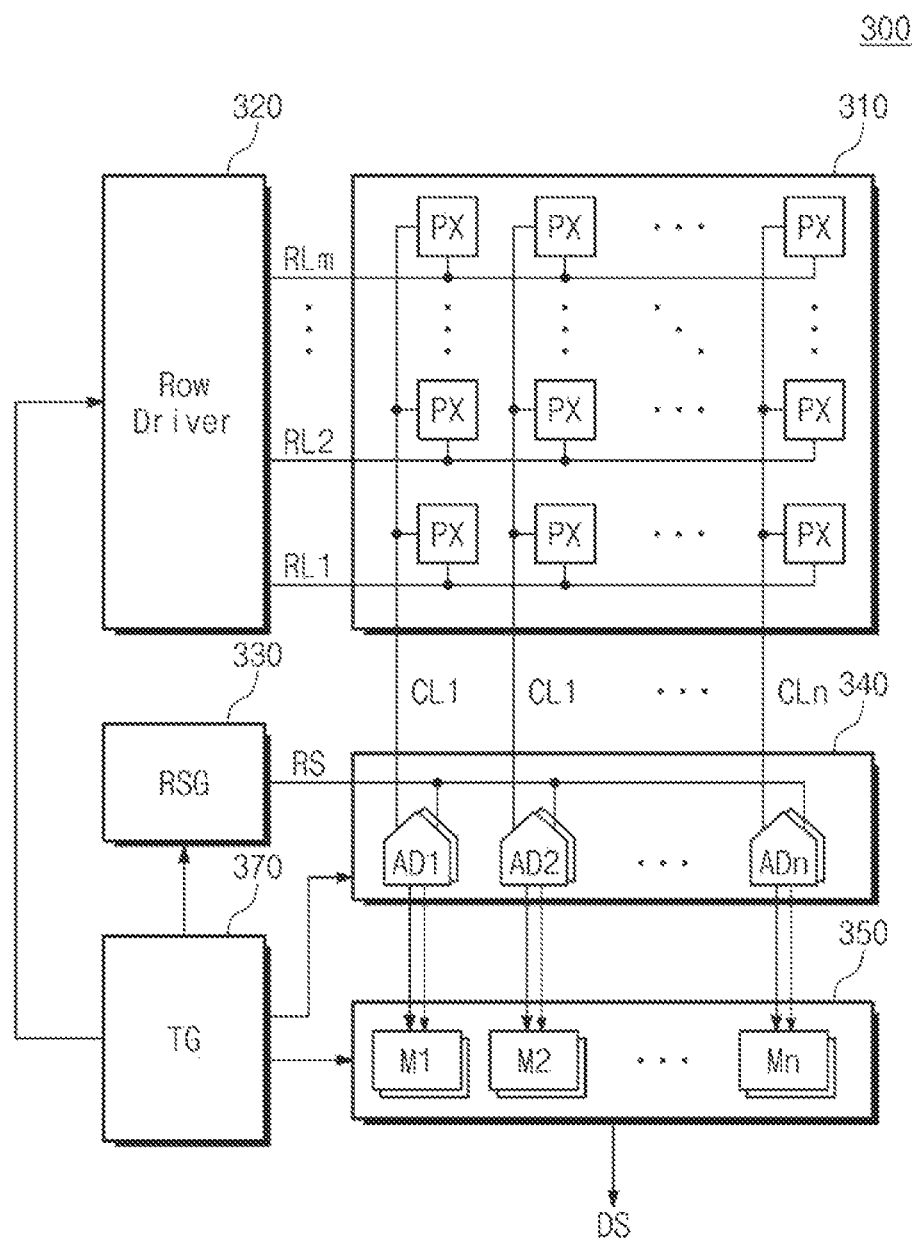
FIG. 3 is a diagram illustrating an image sensor according to an example embodiment of the present disclosure.

FIG. 3 is a diagram illustrating an image sensor according to an example embodiment of the present disclosure. In an example embodiment, the device 300 may correspond to the pixel unit 110 and the data converter 120 of the image sensor 100 of FIG. 1. Referring to FIGS. 1 and 3, the device 300 may include a pixel array 310, a row driver 320, a ramp signal generator (RSG) 330, an analog-to-digital conversion circuit 340, a memory circuit 350, an interface circuit 360, and a timing generator (TG) 370.

In an example embodiment, the pixel array 310 may correspond to the pixel unit 110. The row driver 320, the RSG 330, the analog-to-digital conversion circuit 340, the memory circuit 350, the interface circuit 360, and the TG 370 may correspond to (or may constitute) the data converter 120.

The pixel array 310 may include a plurality of pixels PX arranged in rows and columns in the form of a matrix. Each of the plurality of pixels PX may include a photo detector. For example, the photo detector may include a photo diode, a photo transistor, a photo gate, a pinned photodiode, etc. Each of the plurality of pixels may sense a light using the photo detector and may convert the amount of the sensed light into an electrical signal, for example, a voltage or a current.

A color filter array (CFA) and lenses may be stacked on the pixel array 310. The color filter array may include red (R) filters, green (G) filters, and blue (B) filters. Two or more different color filters may be disposed at the plurality of pixels PX. For example, at least one blue color filter, at least one red color filter, and at least two green color filters may be disposed at the plurality of pixels PX.

The row driver 320 may be connected with rows of the pixels PX of the pixel array 310 through first to m-th row lines RL1 to RLm (m being a positive integer). The row driver 320 may decode an address and/or a control signal generated by the TG 370. Depending on a result of the decoding, the row driver 320 may sequentially select the first to m-th row lines RL1 to RLm of the pixel array 310 and may drive a selected row line with a specific voltage. For example, the row driver 320 may drive a selected row line with a voltage appropriate to sense a light.

Each of the first to m-th row lines RL1 to RLm connected with the rows of the pixels PX may include two or more lines. The two or more lines may respectively transfer, for example, various signals including a signal for selecting (activating) photo detectors of a pixel, a signal for resetting a floating diffusion node, a signal for selecting a column line, a signal for adjusting a conversion gain, etc.

The RSG 330 may generate a ramp signal RS. The RSG 330 may operate under control of the TG 370. For example, the RSG 330 may operate in response to control signals such as a ramp enable signal and a mode signal. In response to that the ramp enable signal is activated, the RSG 330 may generate the ramp signal RS having a slope set based on the mode signal. For example, the RSG 330 may generate the ramp signal RS that continuously decreases or increases from an initial level over time.

The analog-to-digital conversion circuit 340 may be connected with columns of the pixels PX of the pixel array 310 through first to n-th column lines CL1 to CLn (n being a positive integer). The analog-to-digital conversion circuit 340 may include first to n-th analog-to-digital converters AD1 to ADn respectively connected with the first to n-th column lines CL1 to CLn. The first to n-th analog-to-digital converters AD1 to ADn may receive the ramp signal RS from the RSG 330 in common.

The first to n-th analog-to-digital converters AD1 to ADn may compare voltages (or currents) of the first to n-th column lines CL1 to CLn with the ramp signal RS. The ramp signal refers to a signal that decreases (or increases) at a given rate. The first to n-th analog-to-digital converters AD1 to ADn may latch count values until the ramp signal RS is smaller than pixel voltages (or pixel currents) of the first to n-th column lines CL1 to CLn and may convert and output the latched count values into digital values. That is, the first to n-th analog-to-digital converters AD1 to ADn may output digital values corresponding to magnitudes (or amounts) of the voltages (or currents) output from the pixels PX to the first to n-th column lines CL1 to CLn.

Each of the first to n-th analog-to-digital converters AD1 to ADn may include at least two sub-converters. The sub-converters may be connected in common with the corresponding column line and may receive the ramp signal RS in common. Resolutions of the sub-converters may be equal or different. The sub-converters may be activated at different timings to convert a voltage (or current) of the corresponding column line into digital values (or digital signals).

The memory circuit 350 may include first to n-th memories M1 to Mn respectively corresponding to the first to n-th analog-to-digital converters AD1 to ADn. The first to n-th memories M1 to Mn may store the digital values (or digital signals) received from the first to n-th analog-to-digital converters AD1 to ADn and may send the stored values (or signals) to the processor 130 of FIG. 1.

The TG 370 may control timings at which the device 300 operates. The TG 370 may control timings when the row driver 320 sequentially selects the first to m-th row lines RL1 to RLm and may control timings when signals are transferred through two or more lines included in a row line selected from the first to m-th row lines RL1 to RLm.

The TG 370 may control timings when the RSG 330 generates the ramp signal RS and initializes the ramp signal RS. The TG 370 may control timings when the first to n-th analog-to-digital converters AD1 to ADn start a count operation and a comparison operation and timings when the first to n-th analog-to-digital converters AD1 to ADn are initialized.

Figure 4:
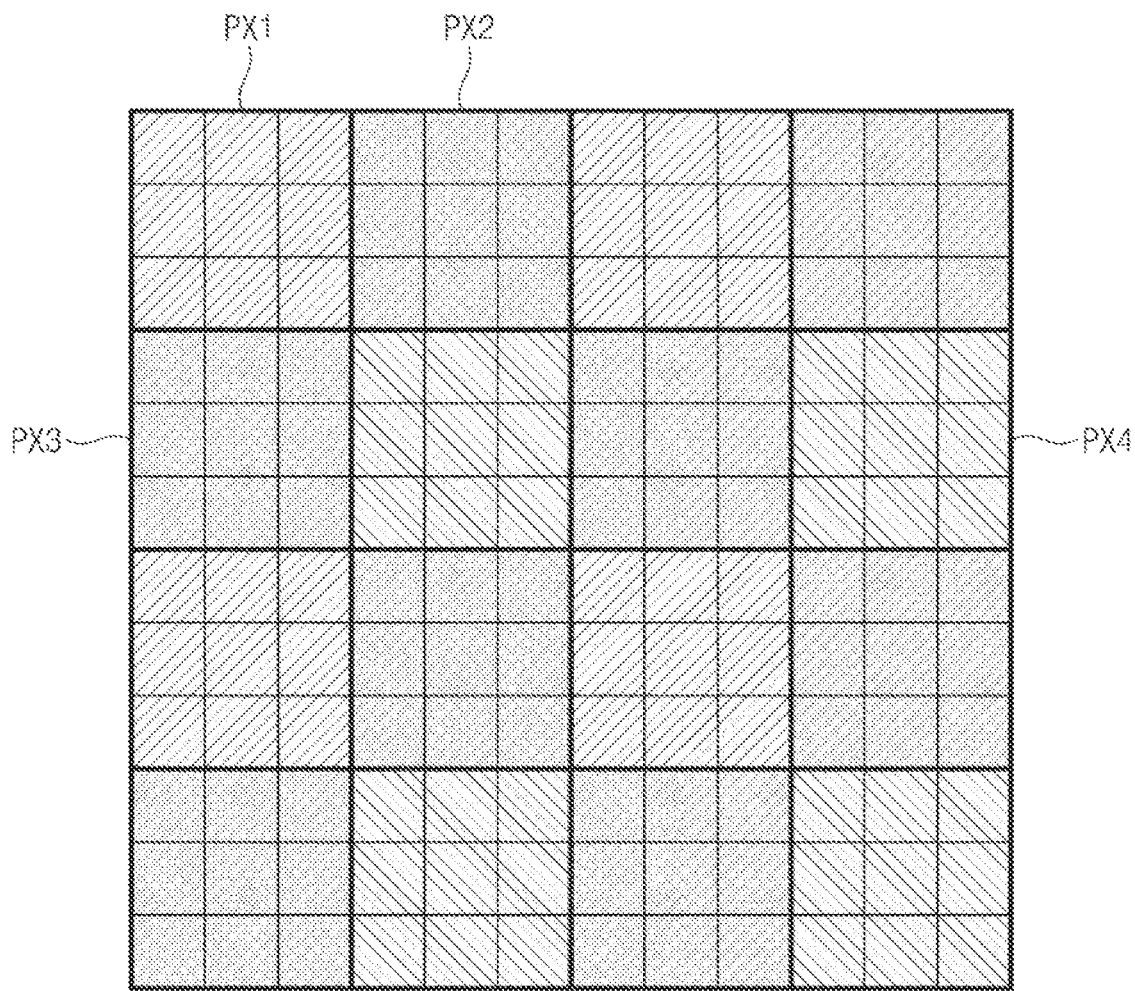
FIG. 4 is a diagram illustrating an example where pixels of an image sensor are arranged according to an example embodiment of the present disclosure.

FIG. 4 is a diagram illustrating an example where pixels of the pixel unit 110 are arranged according to an example embodiment of the present disclosure. Referring to FIGS. 1, 3, and 4, the pixel unit 110 may have a pattern where a first pixel PX1, a second pixel PX2, a third pixel PX3, and a fourth pixel PX4 are respectively disposed at the upper left, the upper right, the lower left, and the lower right and which is repeated in the form of a two dimension.

Each of the first pixel PX1, the second pixel PX2, the third pixel PX3, and the fourth pixel PX4 may include a plurality of sub-pixels. An example embodiment where each of the first pixel PX1, the second pixel PX2, the third pixel PX3, and the fourth pixel PX4 includes nine sub-pixels is illustrated, but the number of sub-pixels included in each of the first pixel PX1, the second pixel PX2, the third pixel PX3, and the fourth pixel PX4 is not limited thereto.

In an example embodiment, the sub-pixels of the first pixel PX1 may share a red (R) color filter. The sub-pixels of the second pixel PX2 may share a green (G) (e.g., Gr) color filter. The sub-pixels of the third pixel PX3 may share a green (G) (e.g., Gb) color filter. The sub-pixels of the fourth pixel PX4 may share a blue (B) color filter.

Figure 5:
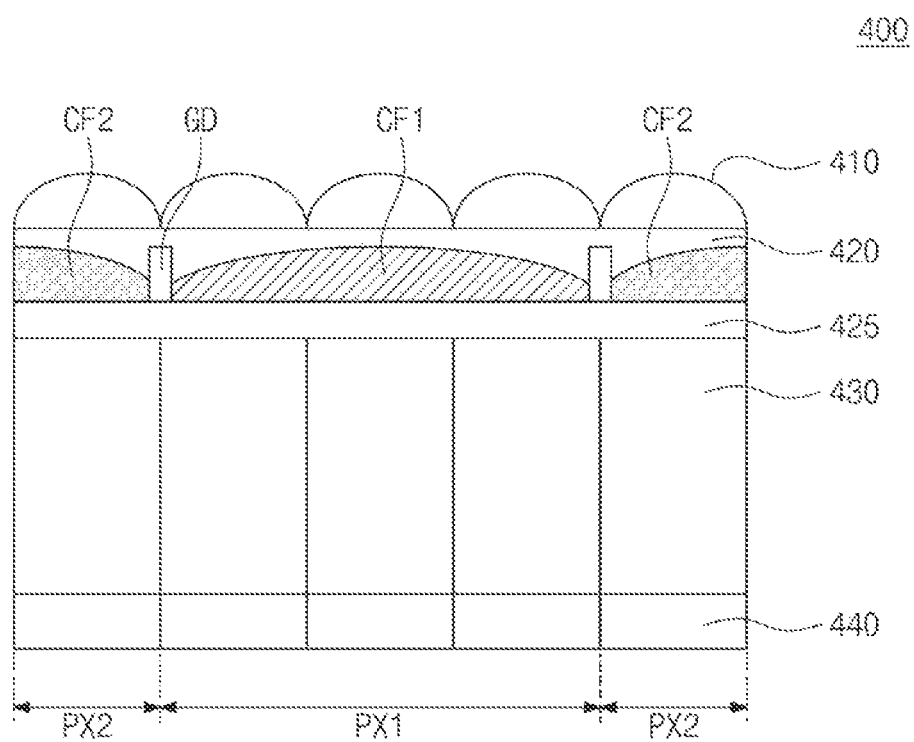
FIG. 5 is a cross-sectional view of pixels of a pixel array according to an example embodiment of the present disclosure.

FIG. 5 is a cross-sectional view of pixels of a pixel array 400 according to an example embodiment of the present disclosure. In an example embodiment, the pixel array 400 may correspond to the pixel array 310 of the device 300. Referring to FIGS. 3, 4, and 5, the pixel array 400 may include micro lenses 410 that respectively correspond to sub-pixels and concentrate the incident light to corresponding sub-pixels, a color filter area 420 that is under the micro lenses 410, an anti-reflection film 425 that is under the color filter area 420 and prevents the reflection of the incident light, photoelectric conversion areas 430 that generate charges based on the incident light, and sensing circuits 440 that are under the photoelectric conversion areas 430 and sense the charges generated by the photoelectric conversion areas 430. The photoelectric conversion areas 430 may be electrically insulated from each other.

In the color filter area 420, a first color filter CF1 may be provided over the sub-pixels of the first pixel PX1. The first color filter CF1 may pass a light of a frequency corresponding to the red color. In the color filter area 420, a second color filter CF2 may be provided over the sub-pixels of the second pixel PX2. The second color filter CF2 may pass a light of a frequency corresponding to the green color. Grids GD that include a metal component and prevent the crosstalk of the incident light may be provided between color filters of the color filter area 420, for example, the first color filter CF1 and the second color filter CF2.

Similar to the first pixel PX1 and the second pixel PX2, a color filter that passes a light of a frequency corresponding to the green color may be provided over the sub-pixels of the third pixel PX3, and a color filter that passes a light of a frequency corresponding to the blue color may be provided over the sub-pixels of the fourth pixel PX4.

Reflection materials that prevent the light from being leaked out to adjacent sub-pixels or pixels may be provided between the photoelectric conversion areas 430 of the first pixel PX1, the second pixel PX2, the third pixel PX3, and the fourth pixel PX4 and between the photoelectric conversion areas 430 of the sub-pixels of the first pixel PX1, the second pixel PX2, the third pixel PX3, and the fourth pixel PX4.

The sensing circuit 440 may include transistors that are connected with a corresponding column line among the first to n-th column lines CL1 to CLn and a corresponding row line among the first to m-th row lines RL1 to RLm.

As illustrated in FIG. 4, the thickness of the color filter CF1 or CF2 may not be uniform. The thickness of the first color filter CF1 corresponding to a sub-pixel of a central portion of the first pixel PX1 may be greater than the thicknesses of the first color filter CF1 corresponding to sub-pixels of peripheral portions of the first pixel PX1. Accordingly, even though the light of the same brightness (or illuminance) is incident in the same direction (e.g., a vertical direction), a pixel value that is sensed by the sub-pixel of the central portion of the first pixel PX1 may be smaller than pixel values that are sensed by the sub-pixels of the peripheral portions of the first pixel PX1. Also, the sub-pixel of the central portion of the first pixel PX1 is adjacent to sub-pixels of the same color filter (or a color filter of the same color). However, the sub-pixels of the peripheral portions of the first pixel PX1 may be adjacent to sub-pixels of the same color filter and sub-pixels of a color filter(s) of a different color(s). That is, the influence of the crosstalk may vary depending on the environment of the sub-pixels.

When the brightness (or illuminance) is lower than the reference value (or an illuminance reference value), the binning module 132 of the processor 130 (refer to FIG. 1) may perform binning. For example, the binning module 132 may sum (or calculate a mean of) the pixel values of the sub-pixels of each of the first pixel PX1, the second pixel PX2, the third pixel PX3, and the fourth pixel PX4. That is, the processor 130 may generate the image data ID including the pixel values of the sub-pixels of the first pixel PX1, the second pixel PX2, the third pixel PX3, and the fourth pixel PX4. Because the image data ID that are obtained as the binning result are based on the Bayer pattern, a separate conversion operation is not required.

When the brightness (or illuminance) is greater than or equal to the reference value (or the illuminance reference value), the remosaic module 131 of the processor 130 (refer to FIG. 1) may perform remosaic. For example, the remosaic module 131 may perform remosaic on the analog signal AS so as to be converted to the Bayer pattern in a state where the pixel values of the sub-pixel unit are maintained.

Figure 6:
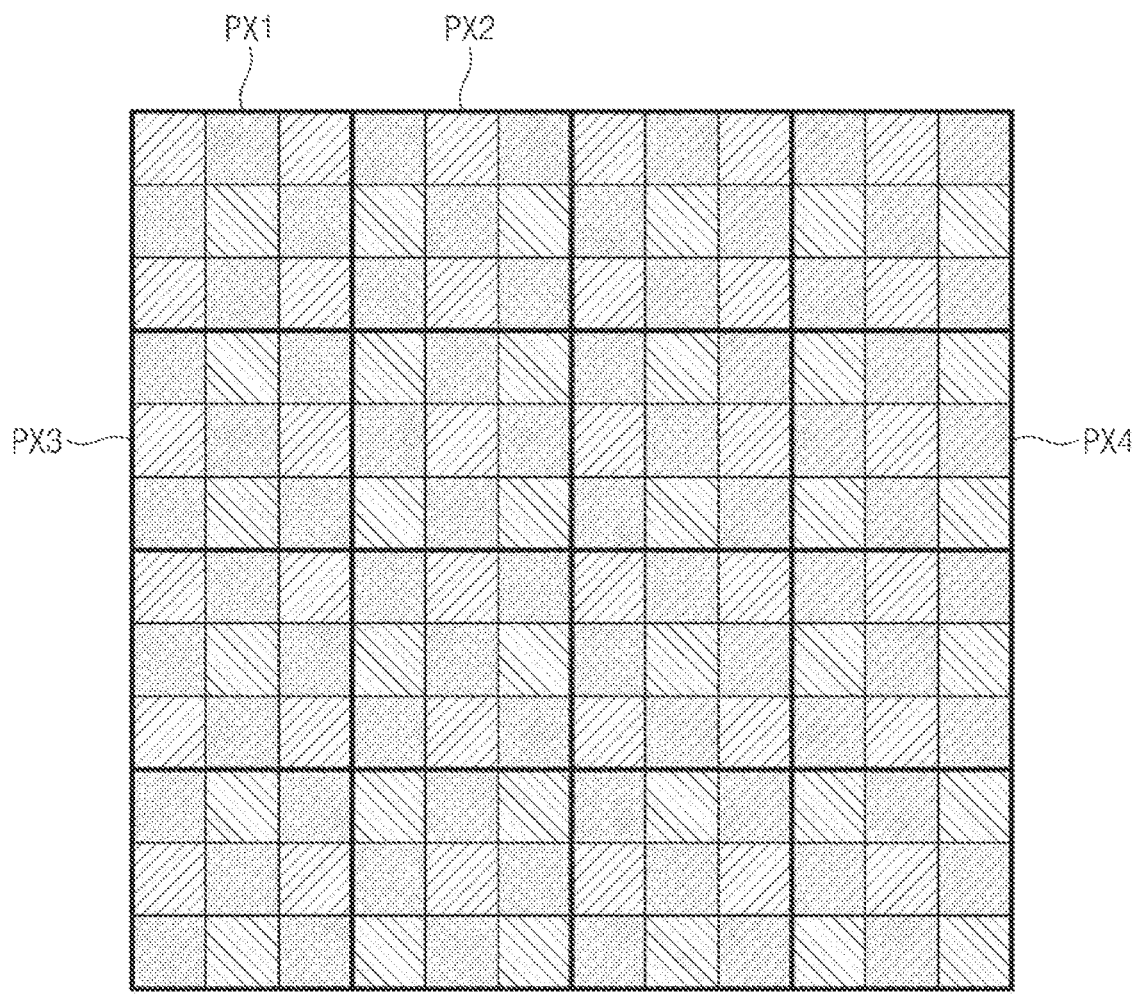
FIG. 6 is a diagram illustrating an example of pixel values experiencing remosaic according to an example embodiment of the present disclosure.

FIG. 6 is a diagram illustrating an example of pixel values experiencing remosaic according to an example embodiment of the present disclosure. Referring to FIGS. 3, 4, 5, and 6, pixel values respectively corresponding to sub-pixels may be converted so as to be based on the Bayer pattern. For example, a pixel value corresponding to the sub-pixel at the first row and first column of the first pixel PX1 may be maintained to correspond to a red pixel value. A pixel value corresponding to the sub-pixel at the first row and second column of the first pixel PX1 may be converted (e.g., based on interpolation) to correspond to a green pixel value. A pixel value corresponding to the sub-pixel at the first row and third column of the first pixel PX1 may be maintained to correspond to a red pixel value.

A pixel value corresponding to the sub-pixel at the second row and first column of the first pixel PX1 may be converted (e.g., based on interpolation) to correspond to a green pixel value. A pixel value corresponding to the sub-pixel at the second row and second column of the first pixel PX1 may be converted (e.g., based on interpolation) to correspond to a blue pixel value. A pixel value corresponding to the sub-pixel at the second row and third column of the first pixel PX1 may be converted (e.g., based on interpolation) to correspond to a green pixel value.

A pixel value corresponding to the sub-pixel at the third row and first column of the first pixel PX1 may be maintained to correspond to a red pixel value. A pixel value corresponding to the sub-pixel at the third row and second column of the first pixel PX1 may be maintained (e.g., based on interpolation) to correspond to a green pixel value. A pixel value corresponding to the sub-pixel at the third row and third column of the first pixel PX1 may be maintained to correspond to a red pixel value.

A pixel value corresponding to the sub-pixel at the first row and first column of the second pixel PX2 may be maintained to correspond to a green pixel value. A pixel value corresponding to the sub-pixel at the first row and second column of the second pixel PX2 may be converted (e.g., based on interpolation) to correspond to a red pixel value. A pixel value corresponding to the sub-pixel at the first row and third column of the second pixel PX2 may be maintained to correspond to a green pixel value.

A pixel value corresponding to the sub-pixel at the second row and first column of the second pixel PX2 may be converted (e.g., based on interpolation) to correspond to a blue pixel value. A pixel value corresponding to the sub-pixel at the second row and second column of the second pixel PX2 may be maintained to correspond to a green pixel value. A pixel value corresponding to the sub-pixel at the second row and third column of the second pixel PX2 may be converted (e.g., based on interpolation) to correspond to a blue pixel value.

A pixel value corresponding to the sub-pixel at the third row and first column of the second pixel PX2 may be maintained to correspond to a green pixel value. A pixel value corresponding to the sub-pixel at the third row and second column of the second pixel PX2 may be converted (e.g., based on interpolation) to correspond to a red pixel value. A pixel value corresponding to the sub-pixel at the third row and third column of the second pixel PX2 may be maintained to correspond to a green pixel value.

Likewise, pixel values of the sub-pixels of the third pixel PX3 and the fourth pixel PX4 may also be converted based on the Bayer pattern. In an example embodiment, in FIGS. 5 and 6, a pixel value corresponding to a sub-pixel depicted as having a diagonal line filling pattern and facing from the upper right to the lower left may be a pixel value corresponding to the red color. A pixel value corresponding to a sub-pixel that is depicted as having a diagonal line filling pattern and facing from the upper left to the lower right may be a pixel value corresponding to the blue color. A pixel value corresponding to a sub-pixel that is depicted as having a dot filling pattern (i.e., a non-diagonal line filling pattern) may be a pixel value corresponding to the green color.

As described with reference to FIG. 5, a pixel value that is sensed by a sub-pixel placed at the central portion from among the sub-pixels of each of the first pixel PX1, the second pixel PX2, the third pixel PX3, and the fourth pixel PX4 may be smaller than pixel values that are sensed by sub-pixels placed at the peripheral portions. Accordingly, the crosstalk that a pixel value corresponding to a sub-pixel of the central portion is smaller than pixel values corresponding to sub-pixels of the peripheral portions may occur in the pixel values corresponding to the sub-pixels of FIG. 6.

Figure 7:
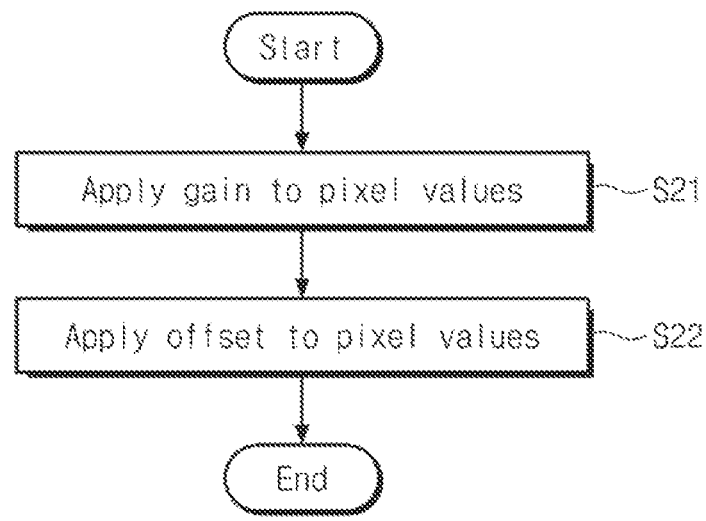
FIG. 7 is a flowchart illustrating an example of a method where a crosstalk correction module of a processor in an image sensor corrects a crosstalk according to an example embodiment of the present disclosure.

FIG. 7 is a flowchart illustrating an example of a method where a crosstalk correction module 133 of a processor 130 in an image sensor 100 corrects a crosstalk according to an example embodiment of the present disclosure. Referring to FIGS. 1, 6, and 7, in operation S21, the crosstalk correction module 133 may apply the gain to each of pixel values of the sub-pixels of the first pixel PX1, the second pixel PX2, the third pixel PX3, and the fourth pixel PX4. The crosstalk correction module 133 may adjust the pixel values respectively corresponding to the sub-pixels at a ratio, based on the gain.

In operation S22, the crosstalk correction module 133 may apply the offset to the pixel values of the sub-pixels of the first pixel PX1, the second pixel PX2, the third pixel PX3, and the fourth pixel PX4. The crosstalk correction module 133 may adjust (e.g., add or subtract) the pixel values respectively corresponding to the sub-pixels as much as an offset value.

When the light of the maximum brightness (or maximum illuminance) capable of being sensed by the sub-pixels of the first pixel PX1, the second pixel PX2, the third pixel PX3, and the fourth pixel PX4 is incident, the sub-pixels may be saturated and may output maximum pixel values. When the crosstalk correction module 133 performs crosstalk correction on the maximum pixel values that the sub-pixels output, the artifact may occur in the image data ID due to the gain and the offset. Accordingly, the crosstalk correction module 133 may be configured to skip (or not to perform) the crosstalk correction on the saturated pixel values.

Also, as described with reference to FIG. 5, because the thickness of the color filter CF1 or CF2 is not uniform, the peripheral sub-pixels of each of the first pixel PX1, the second pixel PX2, the third pixel PX3, and the fourth pixel PX4 may be saturated, and the central sub-pixel thereof may not be saturated. In this case, the artifact may occur on the image data ID due to the crosstalk.

To prevent the above issue, there is provided herein a crosstalk correction algorithm for performing crosstalk correction on the pixel values of the sub-pixels in a situation where some sub-pixels are saturated. The processor 130 of the image sensor 100 according to an example embodiment of the present disclosure may remove (or suppress) the artifact due to the crosstalk in a situation where some sub-pixels are saturated, by calculating a saturation ratio from the image data information IDI and adjusting remosaic settings based on the saturation ratio.

Figure 8:
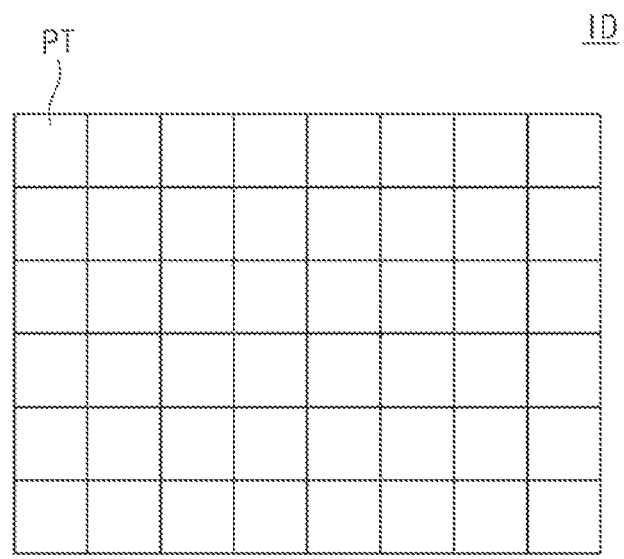
FIG. 8 is a diagram illustrating an example where an application processor generates image data information from image data according to an example embodiment of the present disclosure.

FIG. 8 is a diagram illustrating an example where an application processor 200 generates image data information IDI from image data ID according to an example embodiment of the present disclosure. Referring to FIGS. 1 and 8, the application processor 200 may divide the image data ID into patches PT. Each of the patches PT may include pixel values corresponding to a group of two or more pixels (or sub-pixels). The patches PT may be obtained by dividing the image data ID in the form of a lattice. The application processor 200 may generate the image data information IDI based on the patches PT.

For example, in the pixel values of FIG. 6, the pixel values corresponding to the red sub-pixels may be classified as the patches PT of the channel corresponding to the red color. The pixel values corresponding to the blue sub-pixels may be classified as the patches PT of the channel corresponding to the blue color. The pixel values corresponding to the green sub-pixels may be classified as the patches PT of the channel corresponding to the green color. Alternatively, the pixel values corresponding to the sub-pixels of a first-type green color (e.g., Gr) may be classified as the patches PT of the channel corresponding to the first-type green color, and the pixel values corresponding to the sub-pixels of a second-type green color (e.g., Gb) may be classified as the patches PT of the channel corresponding to the second-type green color.

Figure 9:
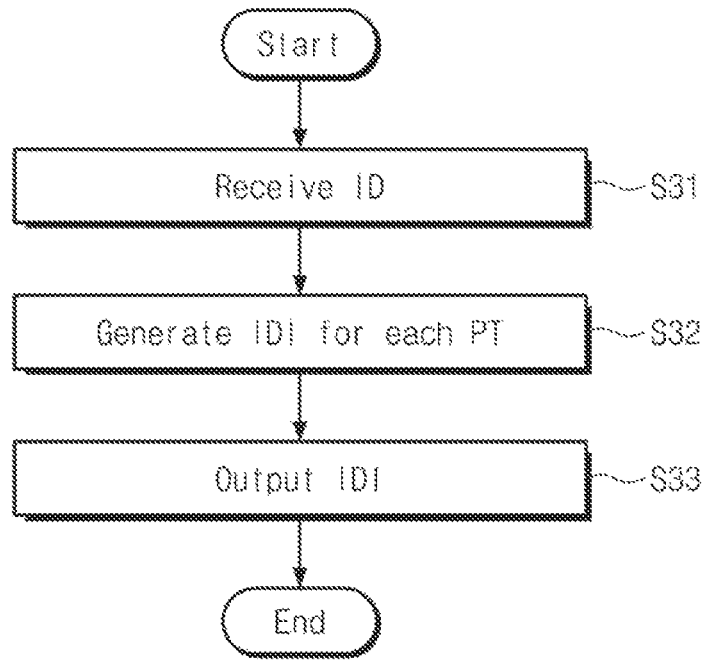
FIG. 9 is a flowchart illustrating an example of a process where an application processor sends image data information to an image sensor according to an example embodiment of the present disclosure.

FIG. 9 is a flowchart illustrating an example of a process where an application processor 200 sends image data information IDI to an image sensor 100 according to an example embodiment of the present disclosure. Referring to FIGS. 1 and 9, in operation S31, the application processor 200 may receive the image data ID from the image sensor 100. In operation S32, the application processor 200 may generate the image data information IDI for each patch PT. In operation S33, the application processor 200 may output the image data information IDI thus generated to the image sensor 100.

For example, the image data information IDI may include information of pixel values of each of the patches PT, for example, a mean pixel value. The image data information IDI may include mean pixel values of a plurality of channels (e.g., a red (R) channel, a green (G) channel (or Gr and Gb channels), and a blue (B) channel) of each of the patches PT.

As another example, the image data information IDI may include the number of saturated pixel values for each patch PT. The image data information IDI may include the number of saturated pixel values for each of a plurality of channels (e.g., a red (R) channel, a green (G) channel (or Gr and Gb channels), and a blue (B) channel) of each patch PT.

Figure 10:
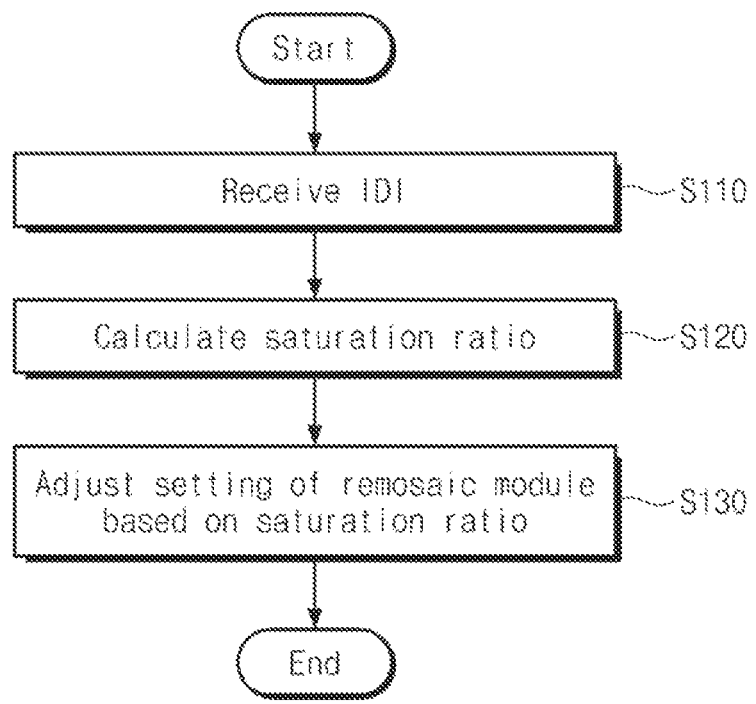
FIG. 10 is a flowchart illustrating an example of a method where a processor of an image sensor suppresses a crosstalk based on a saturation ratio according to an example embodiment of the present disclosure.

FIG. 10 is a flowchart illustrating an example of a method where a processor 130 of an image sensor 100 suppresses a crosstalk based on a saturation ratio according to an example embodiment of the present disclosure. Referring to FIGS. 1 and 10, in operation S110, the saturation management module 134 of the processor 130 may receive the image data information IDI.

In operation S120, the saturation management module 134 of the processor 130 may calculate the saturation ratio of the image data ID transferred as the previous frame, based on the image data information IDI.

In operation S130, the saturation management module 134 of the processor 130 may adjust remosaic settings of the remosaic module 131 based on the calculated saturation ratio. For example, the saturation management module 134 may adjust the remosaic settings such that more noises are removed from the image data ID of the current frame together with the crosstalk.

Figure 11:
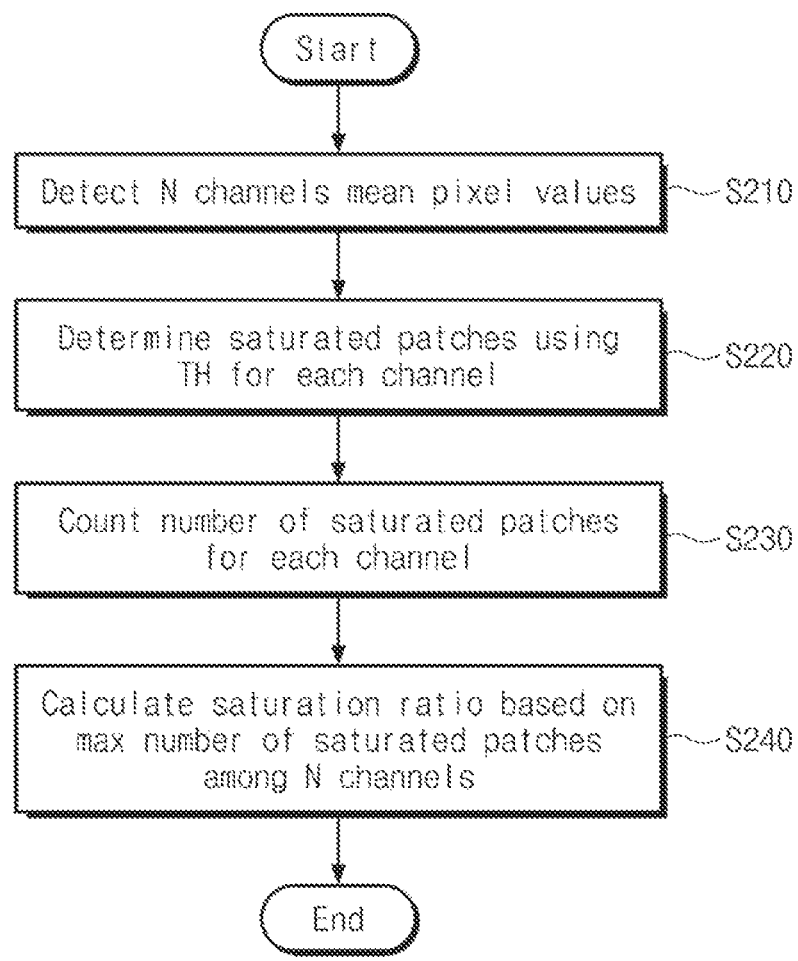
FIG. 11 is a flowchart illustrating an example of a method where a processor of an image sensor calculates a saturation ratio according to an example embodiment of the present disclosure.

FIG. 11 is a flowchart illustrating an example of a method where a processor 130 of an image sensor 100 calculates a saturation ratio according to an example embodiment of the present disclosure. Referring to FIGS. 1, 8, and 11, in operation S210, the saturation management module 134 of the processor 130 may detect N-channel mean pixel values from the image data information IDI. The N-channel mean pixel values (N being a positive integer) may correspond to three channels (e.g., R, G, and B), four channels (e.g., R, Gr, Gb, and B), or an arbitrary number of channels. The mean pixel values of each channel may respectively correspond to the patches PT. For example, the processor 130 may detect mean pixel values of the R-channel patches, mean pixel values of the G-channel patches, and mean pixel values of the B-channel patches from the image data information IDI. Alternatively, the processor 130 may detect mean pixel values of the R-channel patches, mean pixel values of the Gr-channel patches, mean pixel values of the Gb-channel patches, and mean pixel values of the B-channel patches from the image data information IDI.

In operation S220, the saturation management module 134 of the processor 130 may determine saturated patches using a threshold value TH for each channel. For example, the threshold value TH may be determined to have a given ratio (e.g., 90% or 95%) to the maximum pixel value and may be set or adjusted by the application processor 200. Patches PT whose mean pixel values are greater than or equal to the threshold value TH may be determined to be saturated patches. Patches PT whose mean pixel values are smaller than the threshold value TH may be determined to be unsaturated patches. The threshold values TH for the N channels may be set to the same value or to different values.

In operation S230, the saturation management module 134 of the processor 130 may count the number of saturated patches for each channel. The numbers and locations of saturated patches of the N channels may be identical or different.

In operation S240, the saturation management module 134 of the processor 130 may calculate the saturation ratio based on the maximum number of saturated patches associated with a specific channel. For example, the saturation management module 134 may calculate the saturation ratios for the respective N channels and may determine a saturation ratio having the maximum value from among the saturation ratios of the N channels as the final saturation ratio.

In an example embodiment, the N channels may correspond to different frequencies. Colors of the subject photographed by the pixel unit 110 may be various, and only one of the N channels may be saturated. For example, a blue sky on a sunny day may cause the saturation of pixels corresponding to a blue color filter, and a sunset sky may cause the saturation of pixels corresponding to a red color filter. A sunny daytime forest may cause the saturation of pixels corresponding to a green color filter. When pixels of any one channel are saturated, the artifact due to the crosstalk may occur in the image data ID. The image sensor 100 according to an example embodiment of the present disclosure may efficiently prevent (or suppress) the artifact due to the crosstalk using the highest saturation ratio among the saturation ratios of the N channels.

Figure 12:
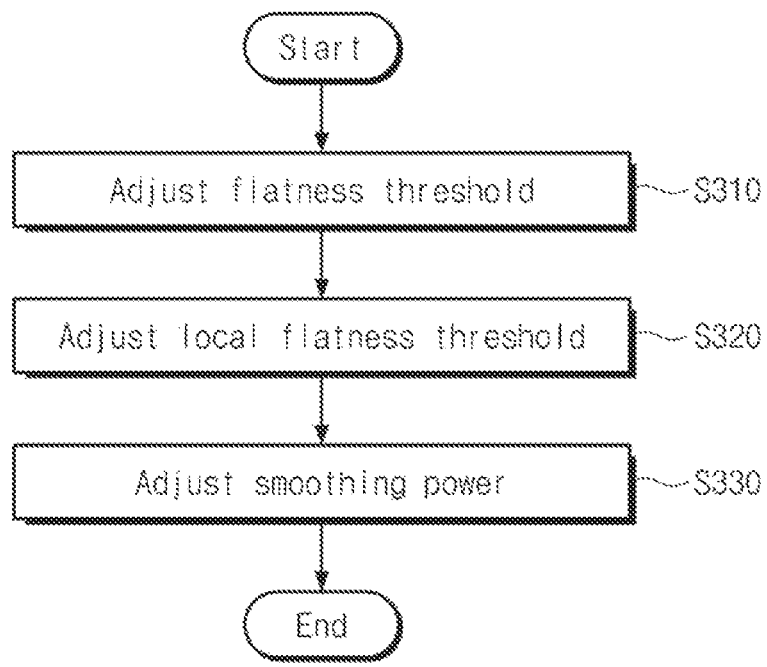
FIG. 12 is a flowchart illustrating an example of a method of adjusting remosaic settings, according to an example embodiment of the present disclosure.

FIG. 12 is a flowchart illustrating an example of a method of adjusting remosaic settings, according to an example embodiment of the present disclosure. Referring to FIGS. 1 and 12, in operation S310, the saturation management module 134 of the processor 130 in the image sensor 100 may adjust a flatness threshold among the remosaic settings of the remosaic module 131. The flatness threshold may be a criterion that is used for the remosaic module 131 to determine whether the digital signal DS is flat.

In operation S320, the saturation management module 134 of the processor 130 in the image sensor 100 may adjust a local flatness threshold among the remosaic settings of the remosaic module 131. The local flatness threshold may be used for the remosaic module 131 to determine an area that is locally flat on the digital signal DS.

In operation S330, the saturation management module 134 of the processor 130 in the image sensor 100 may adjust a smoothing power of the among the remosaic settings of the remosaic module 131. The smoothing power may correspond to a blurring (or low pass filtering) level for the digital signal DS when the remosaic module 131 removes the noise.

Figure 13:
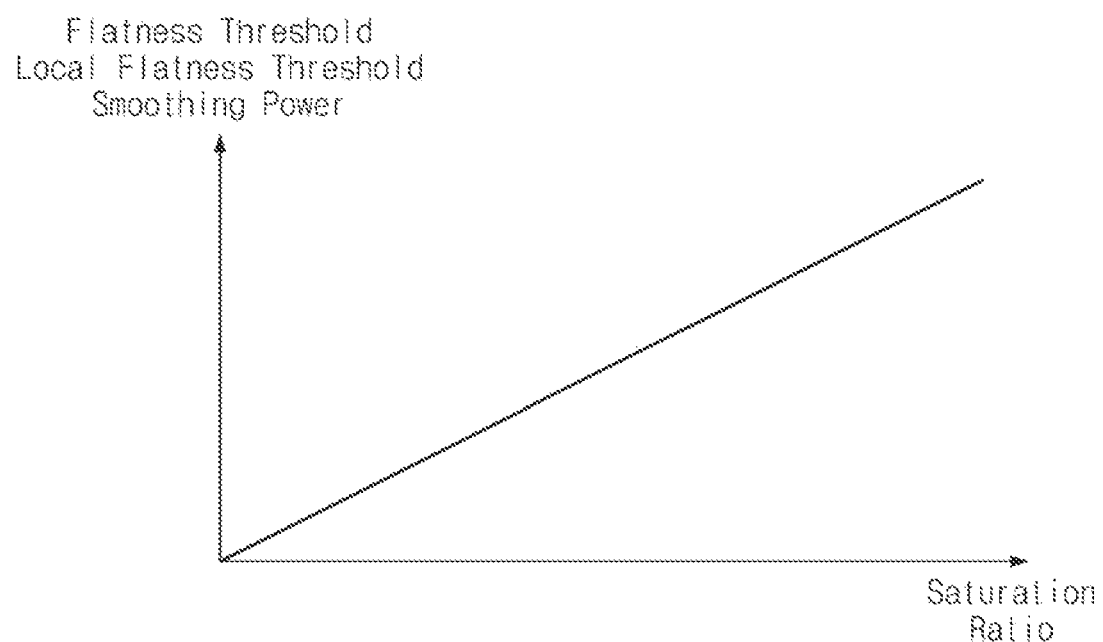
FIG. 13 is a graph illustrating an example of how a processor of an image sensor adjusts remosaic settings depending on a saturation ratio according to an example embodiment of the present disclosure.

FIG. 13 is a graph illustrating an example of how a processor 130 of an image sensor 100 adjusts remosaic settings depending on a saturation ratio according to an example embodiment of the present disclosure. In FIG. 13, a horizontal axis represents a saturation ratio, and a vertical axis represents a flatness threshold, a local flatness threshold, or a smoothing power.

As illustrated in FIG. 13, as the saturation ratio increases, the saturation management module 134 of the processor 130 may increase the flatness threshold, the local flatness threshold, or the smoothing power. In an example embodiment, the saturation management module 134 may increase the flatness threshold, the local flatness threshold, or the smoothing power one-dimensionally, two-dimensionally, three-dimensionally, or exponentially. In an example embodiment, the saturation management module 134 may increase the flatness threshold, the local flatness threshold, or the smoothing power at the same ratio or at different ratios.

Figure 14:
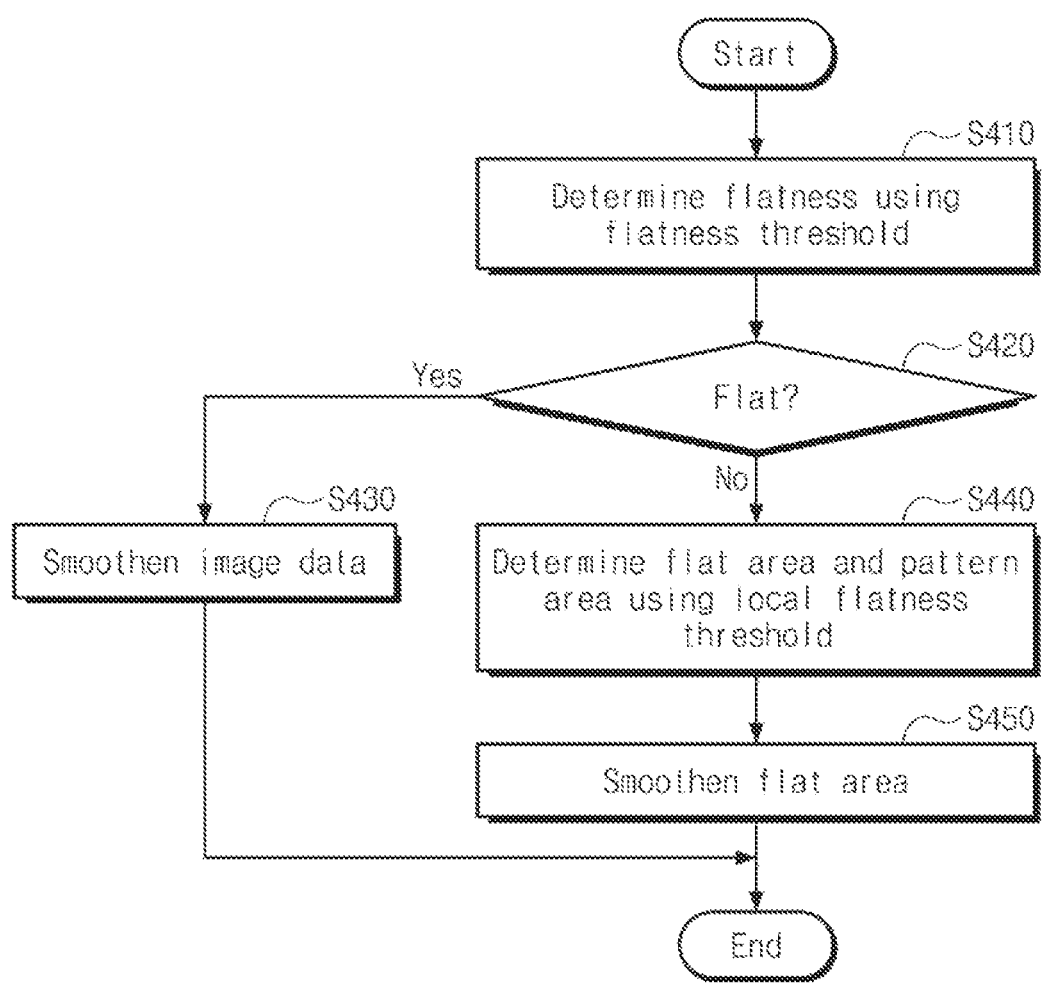
FIG. 14 is a flowchart illustrating an example of a method where a processor of an image sensor performs remosaic based on remosaic settings according to an example embodiment of the present disclosure.

FIG. 14 is a flowchart illustrating an example of a method where a processor 130 of an image sensor 100 performs remosaic based on remosaic settings according to an example embodiment of the present disclosure. Referring to FIGS. 1 and 14, in operation S410, the remosaic module 131 of the processor 130 may determine the flatness of the digital signal DS using the flatness threshold among the remosaic settings. For example, when a difference (e.g., a maximum difference) of pixel values of each of the N channels is smaller than the flatness threshold, the remosaic module 131 may determine that the digital signal DS is flat. When the difference (e.g., the maximum difference) of the pixel values of each of the N channels is greater than or equal to the flatness threshold, the remosaic module 131 may determine that the digital signal DS is not flat.

When it is determined in operation S420 that the digital signal DS is flat, the remosaic module 131 of the processor 130 may perform operation S430. In operation S430, the remosaic module 131 may smoothen the entire digital signal DS. For example, the remosaic module 131 may perform low pass filtering on the digital signal DS based on the smoothing power among the remosaic settings.

When it is determined in operation S420 that the digital signal DS is not flat, the remosaic module 131 of the processor 130 may perform operation S440. In operation S440, the remosaic module 131 may determine a flat area and a pattern area using the local flatness threshold among the remosaic settings. For example, when a difference of pixel values of each of the N channels in a specific area on the digital signal DS is smaller than the local flatness threshold, the remosaic module 131 may determine that the specific area is a flat area. When the difference of the pixel values of each of the N channels in the specific area on the digital signal DS is greater than or equal to the local flatness threshold, the remosaic module 131 may determine that the specific area is a pattern area (e.g., an irregular area).

In operation S450, the remosaic module 131 may smoothen (e.g., perform low pass filtering on) the flat area on the digital signal DS based on the smoothing power among the remosaic settings.

As described above, the image sensor 100 according to an example embodiment of the present disclosure may determine that the digital signal DS is flatter as the saturation ratio increases and may perform the flatness more strongly. Accordingly, the artifact caused by the crosstalk of saturated pixels may be removed (or suppressed) by the flatness.

Figure 15:
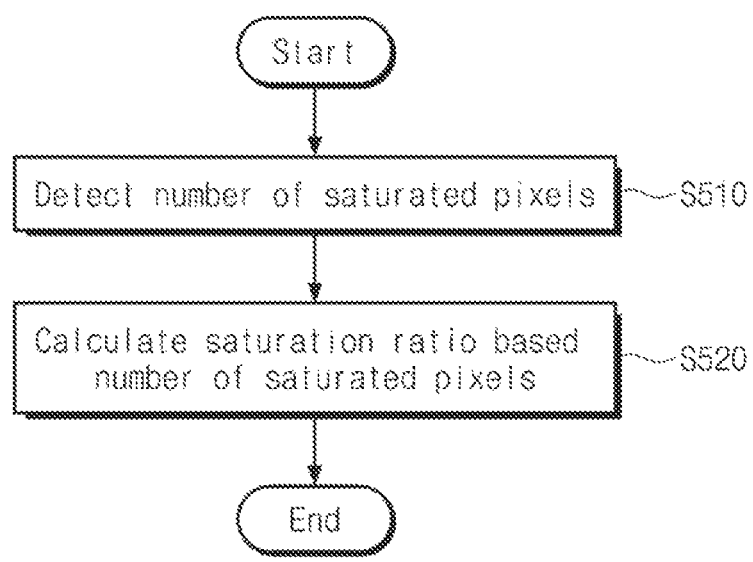
FIG. 15 is a flowchart illustrating an example of a method where a processor of an image sensor calculates a saturation ratio according to an example embodiment of the present disclosure.

FIG. 15 is a flowchart illustrating an example of a method where a processor 130 of an image sensor 100 calculates a saturation ratio according to an example embodiment of the present disclosure. Referring of FIGS. 1 and 15, in operation S510, the saturation management module 134 of the processor 130 may detect the number of saturated pixels from the image data information IDI. For example, the application processor 200 may count the number of saturated pixel values for each patch PT (refer to FIG. 8) and may include the number of saturated pixel values for each patch PT in the image data information IDI. The saturation management module 134 may detect the number of saturated pixels from the number of saturated pixel values for each patch PT from the image data information IDI.

In operation S520, the saturation management module 134 may calculate the saturation ratio based on the number of saturated pixels. For example, the saturation management module 134 may calculate a ratio of the number of saturated pixels to the total number of pixels of the pixel unit 110 as the saturation ratio.

As an example embodiment, the application processor 200 may calculate the number of saturated pixel values to the number of pixel values of each patch PT as the saturation ratio of each patch PT and may include the saturation ratio of each patch PT in the image data information IDI. The saturation management module 134 may detect the saturation ratio of each patch PT from the image data information IDI and may calculate an average of the saturation ratios of the patches PT as the saturation ratio.

Figure 16:
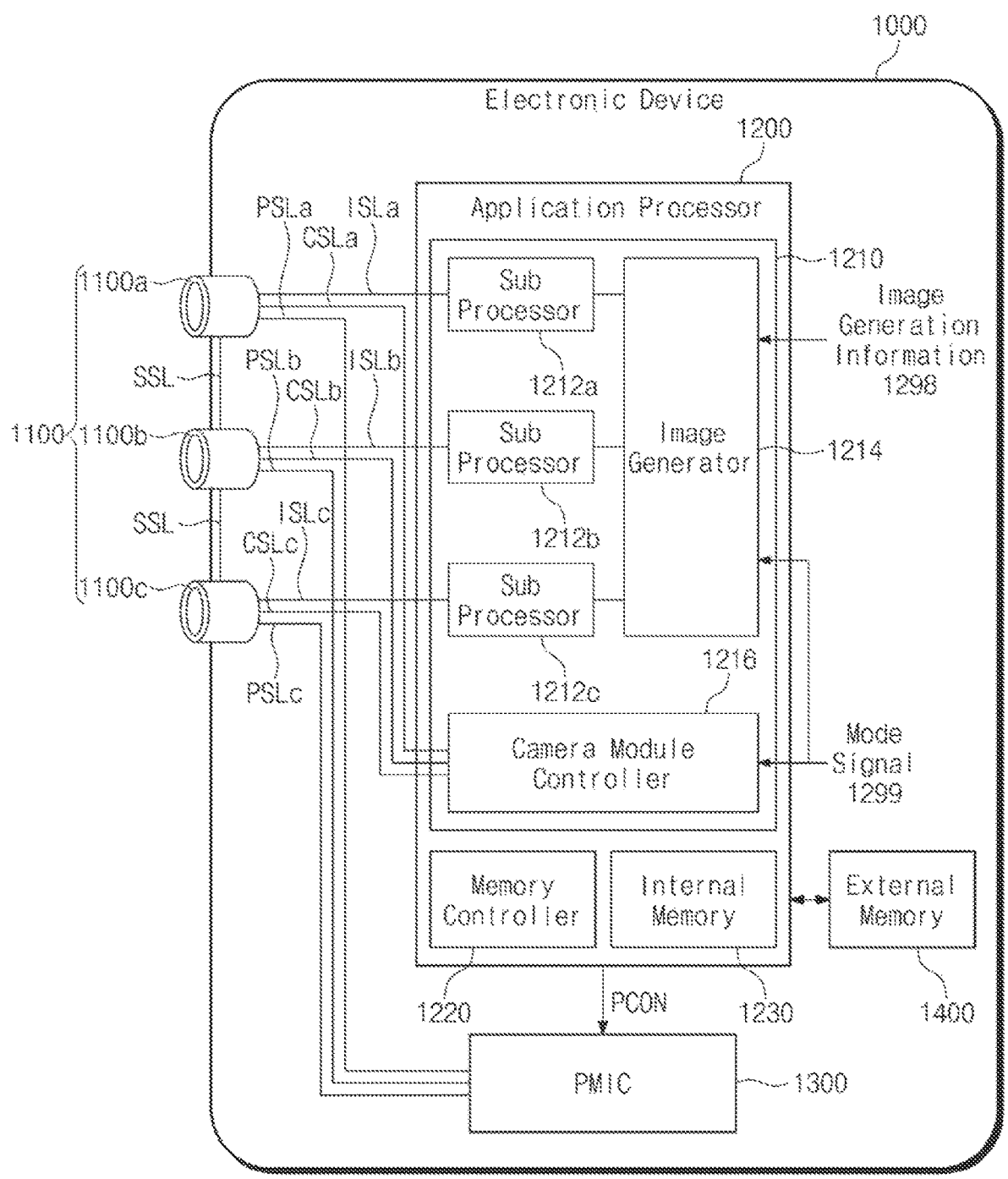
FIG. 16 is a diagram illustrating an electronic device including a multi-camera module according to an example embodiment of the present disclosure.
Figure 17:
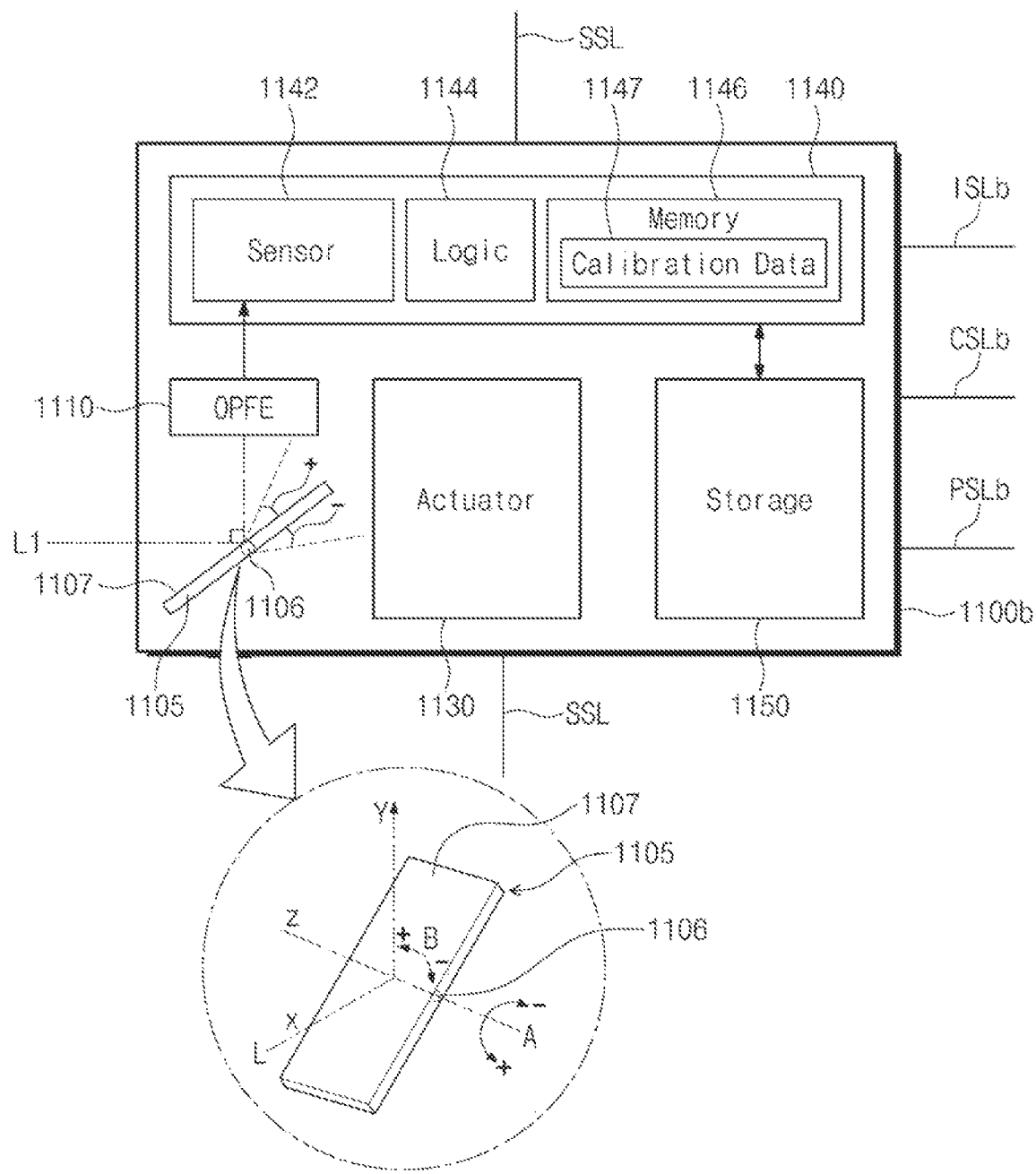
FIG. 17 is a diagram illustrating a camera module of FIG. 16 according to an example embodiment of the present disclosure.

FIG. 16 is a diagram illustrating an electronic device including a multi-camera module according to an example embodiment of the present disclosure. FIG. 17 is a diagram illustrating a camera module of FIG. 16 according to an example embodiment of the present disclosure.

Referring to FIG. 16, an electronic device 1000 may include a camera module group 1100, an application processor 1200, a power management integrated circuit (PMIC) 1300, and an external memory 1400.

The camera module group 1100 may include a plurality of camera modules 1100a, 1100b, and 1100c. An electronic device including three camera modules 1100a, 1100b, and 1100c is illustrated in FIG. 16, but the present disclosure is not limited thereto. In example embodiments, the camera module group 1100 may be modified to include only two camera modules. Also, in example embodiments, the camera module group 1100 may be modified to include "n" camera modules (n being a natural number of 4 or more). For example, each of the plurality of camera modules 1100a, 1100b, and 1100c of the camera module group 1100 may include the image sensor 100 of FIG. 1. The application processor 1200 may include the application processor 200 of FIG. 1.

Below, a detailed configuration of the camera module 1100b will be more fully described with reference to FIG. 17, but the following description may be equally applied to the remaining camera modules 1100a and 1100c.

Referring to FIG. 17, the camera module 1100b may include a prism 1105, an optical path folding element (OPFE) 1110, an actuator 1130, an image sensing device 1140, and storage 1150.

The prism 1105 may include a reflecting plane 1107 of a light reflecting material and may change a path of a light "L" incident from the outside.

In example embodiments, the prism 1105 may change a path of the light "L" incident in a first direction (X) to a second direction (Y) perpendicular to the first direction (X), Also, the prism 1105 may change the path of the light "L" incident in the first direction (X) to the second direction (Y) perpendicular to the first (X-axis) direction by rotating the reflecting plane 1107 of the light reflecting material in direction "A" about a central axis 1106 or rotating the central axis 1106 in direction "B". In this case, the OPFE 1110 may move in a third direction (Z) perpendicular to the first direction (X) and the second direction (Y).

In example embodiments, as illustrated in FIG. 17, a maximum rotation angle of the prism 1105 in direction "A" may be equal to or smaller than 15 degrees in a positive A direction and may be greater than 15 degrees in a negative A direction, but the present disclosure is not limited thereto.

In example embodiments, the prism 1105 may move within approximately 20 degrees in a positive or negative B direction, between 10 degrees and 20 degrees, or between 15 degrees and 20 degrees; here, the prism 1105 may move at the same angle in the positive or negative B direction or may move at a similar angle within approximately 1 degree.

In example embodiments, the prism 1105 may move the reflecting plane 1107 of the light reflecting material in the third direction (e.g., Z direction) parallel to a direction in which the central axis 1106 extends.

The OPFE 1110 may include optical lenses composed of "j" groups (j being a natural number), for example. "j" lens may move in the second direction (Y) to change an optical zoom ratio of the camera module 1100b. For example, when a default optical zoom ratio of the camera module 1100b is "Z", the optical zoom ratio of the camera module 1100b may be changed to an optical zoom ratio of 3Z, 5Z, or 5Z or more by moving "m" optical lens included in the OPFE 1110.

The actuator 1130 may move the OPFE 1110 or an optical lens (hereinafter referred to as an "optical lens") to a specific location. For example, the actuator 1130 may adjust a location of an optical lens such that an image sensor 1142 is placed at a focal length of the optical lens for accurate sensing.

The image sensing device 1140 may include the image sensor 1142, control logic 1144, and a memory 1146. The image sensor 1142 may sense an image of a sensing target using the light "L" provided through an optical lens.

The control logic 1144 may control overall operations of the camera module 1100b. For example, the control logic 1144 may control an operation of the camera module 1100b based on a control signal provided through a control signal line CSLb.

The memory 1146 may store information, which is necessary for an operation of the camera module 1100b, such as calibration data 1147. The calibration data 1147 may include information necessary for the camera module 1100b to generate image data using the light "L" provided from the outside. The calibration data 1147 may include, for example, information about the degree of rotation described above, information about a focal length, information about an optical axis, etc. In the case where the camera module 1100b is implemented in the form of a multi-state camera in which a focal length varies depending on a location of an optical lens, the calibration data 1147 may include a focal length value for each location (or state) of the optical lens and information about auto focusing.

The storage 1150 may store image data sensed through the image sensor 1142. The storage 1150 may be disposed outside the image sensing device 1140 and may be implemented in a shape where the storage 1150 and a sensor chip constituting the image sensing device 1140 are stacked. In example embodiments, the storage 1150 may be implemented with an electrically erasable programmable read only memory (EEPROM), but the present disclosure is not limited thereto.

Referring to FIGS. 16 and 17, in example embodiments, each of the plurality of camera modules 1100a, 1100b, and 1100c may include the actuator 1130. As such, the same calibration data 1147 or different calibration data 1147 may be included in the plurality of camera modules 1100a, 1100b, and 1100c depending on operations of the actuators 1130 therein.

In example embodiments, one camera module (e.g., 1100b) among the plurality of camera modules 1100a, 1100b, and 1100c may be a folded lens shape of camera module in which the prism 1105 and the OPFE 1110 described above are included, and the remaining camera modules (e.g., 1100a and 1100c) may be a vertical shape of camera module in which the prism 1105 and the OPFE 1110 described above are not included; however, the present disclosure is not limited thereto.

In example embodiments, one camera module (e.g., 1100c) among the plurality of camera modules 1100a, 1100b, and 1100c may be, for example, a vertical shape of depth camera extracting depth information using an infrared (IR) ray. In this case, the application processor 1200 may merge image data provided from the depth camera and image data provided from any other camera module (e.g., 1100a or 1100b) and may generate a three-dimensional (3D) depth image.

In example embodiments, at least two camera modules (e.g., 1100a and 1100b) among the plurality of camera modules 1100a, 1100b, and 1100c may have different fields of view. In this case, the at least two camera modules (e.g., 1100a and 1100b) among the plurality of camera modules 1100a, 1100b, and 1100c may include different optical lens, but the present disclosure is not limited thereto.

Also, in example embodiments, fields of view of the plurality of camera modules 1100a, 1100b, and 1100c may be different. In this case, the plurality of camera modules 1100a, 1100b, and 1100c may include different optical lens, not limited thereto.

In example embodiments, the plurality of camera modules 1100a, 1100b, and 1100c may be disposed to be physically separated from each other. That is, the plurality of camera modules 1100a, 1100b, and 1100c may not use a sensing area of one image sensor 1142, but the plurality of camera modules 1100a, 1100b, and 1100c may include independent image sensors 1142 therein, respectively.

Referring to FIG. 16, the application processor 1200 may include an image processing device 1210, a memory controller 1220, and an internal memory 1230. The application processor 1200 may be implemented to be separated from the plurality of camera modules 1100a, 1100b, and 1100c. For example, the application processor 1200 and the plurality of camera modules 1100a, 1100b, and 1100c may be implemented with separate semiconductor chips.

The image processing device 1210 may include a plurality of sub image processors 1212a, 1212b, and 1212c, an image generator 1214, and a camera module controller 1216.

The image processing device 1210 may include the plurality of sub image processors 1212a, 1212b, and 1212c, the number of which corresponds to the number of the plurality of camera modules 1100a, 1100b, and 1100c.

Image data respectively generated from the camera modules 1100a, 1100b, and 1100c may be respectively provided to the corresponding sub image processors 1212a, 1212b, and 1212c through separated image signal lines ISLa, ISLb, and ISLc. For example, the image data generated from the camera module 1100a may be provided to the sub image processor 1212a through the image signal line ISLa, the image data generated from the camera module 1100b may be provided to the sub image processor 1212b through the image signal line ISLb, and the image data generated from the camera module 1100c may be provided to the sub image processor 1212c through the image signal line ISLc. This image data transmission may be performed, for example, using a camera serial interface based on the MIPI, but the present disclosure is not limited thereto.

In example embodiments, one sub image processor may be disposed to correspond to a plurality of camera modules. For example, the sub image processor 1212a and the sub image processor 1212c may be integrally implemented, not separated from each other as illustrated in FIG. 16; in this case, one of the pieces of image data respectively provided from the camera module 1100a and the camera module 1100c may be selected through a selection element (e.g., a multiplexer), and the selected image data may be provided to the integrated sub image processor.

The image data respectively provided to the sub image processors 1212a, 1212b, and 1212c may be provided to the image generator 1214. The image generator 1214 may generate an output image using the image data respectively provided from the sub image processors 1212a, 1212b, and 1212c, depending on image generating information 1298 or a mode signal 1299.

In detail, the image generator 1214 may generate the output image by merging at least a portion of the image data respectively generated from the camera modules 1100a, 1100b, and 1100c having different fields of view, depending on the image generating information 1298 or the mode signal 1299. Also, the image generator 1214 may generate the output image by selecting one of the image data respectively generated from the camera modules 1100a, 1100b, and 1100c having different fields of view, depending on the image generating information 1298 or the mode signal 1299.

In example embodiments, the image generating information 1298 may include a zoom signal or a zoom factor. Also, in example embodiments, the mode signal 1299 may be, for example, a signal based on a mode selected from a user.

In the case where the image generating information 1298 is the zoom signal (or zoom factor) and the camera modules 1100a, 1100b, and 1100c have different visual fields of view, the image generator 1214 may perform different operations depending on a kind of the zoom signal. For example, in the case where the zoom signal is a first signal, the image generator 1214 may merge the image data output from the camera module 1100a and the image data output from the camera module 1100c and may generate the output image using the merged image signal and the image data output from the camera module 1100b that is not used in the merging operation. In the case where the zoom signal is a second signal different from the first signal, without the image data merging operation, the image generator 1214 may select one of the image data respectively output from the camera modules 1100a, 1100b, and 1100c and may output the selected image data as the output image. However, the present disclosure is not limited thereto, and a way to process image data may be modified without limitation if necessary.

In example embodiments, the image generator 1214 may generate merged image data having an increased dynamic range by receiving a plurality of image data of different exposure times from at least one of the plurality of sub image processors 1212a, 1212b, and 1212c and performing high dynamic range (HDR) processing on the plurality of image data.

The camera module controller 1216 may provide control signals to the camera modules 1100a, 1100b, and 1100c, respectively. The control signals generated from the camera module controller 1216 may be respectively provided to the corresponding camera modules 1100a, 1100b, and 1100c through control signal lines CSLa, CSLb, and CSLc separated from each other.

One of the plurality of camera modules 1100a, 1100b, and 1100c may be designated as a master camera (e.g., 1100b) depending on the image generating information 1298 including a zoom signal or the mode signal 1299, and the remaining camera modules (e.g., 1100a and 1100c) may be designated as a slave camera. The above designation information may be included in the control signals, and the control signals including the designation information may be respectively provided to the corresponding camera modules 1100a, 1100b, and 1100c through the control signal lines CSLa, CSLb, and CSLc separated from each other.

Camera modules operating as a master and a slave may be changed depending on the zoom factor or an operating mode signal. For example, in the case where the field of view of the camera module 1100a is wider than the field of view of the camera module 1100b and the zoom factor indicates a low zoom ratio, the camera module 1100b may operate as a master, and the camera module 1100a may operate as a slave. In contrast, in the case where the zoom factor indicates a high zoom ratio, the camera module 1100a may operate as a master, and the camera module 1100b may operate as a slave.

In example embodiments, the control signal provided from the camera module controller 1216 to each of the camera modules 1100a, 1100b, and 1100c may include a sync enable signal. For example, in the case where the camera module 1100b is used as a master camera and the camera modules 1100a and 1100c are used as a slave camera, the camera module controller 1216 may transmit the sync enable signal to the camera module 1100b. The camera module 1100b that is provided with sync enable signal may generate a sync signal based on the provided sync enable signal and may provide the generated sync signal to the camera modules 1100a and 1100c through a sync signal line SSL. The camera module 1100b and the camera modules 1100a and 1100c may be synchronized with the sync signal to transmit image data to the application processor 1200.

In example embodiments, the control signal provided from the camera module controller 1216 to each of the camera modules 1100a, 1100b, and 1100c may include mode information according to the mode signal. Based on the mode information, the plurality of camera modules 1100a, 1100b, and 1100c may operate in a first operating mode and a second operating mode with regard to a sensing speed.

In the first operating mode, the plurality of camera modules 1100a, 1100b, and 1100c may generate image signals at a first speed (e.g., may generate image signals of a first frame rate), may encode the image signals at a second speed (e.g., may encode the image signal of a second frame rate higher than the first frame rate), and transmit the encoded image signals to the application processor 1200. In this case, the second speed may be 30 times or less the first speed.

The application processor 1200 may store the received image signals, that is, the encoded image signals in the internal memory 1230 provided therein or the external memory 1400 placed outside the application processor 1200. Afterwards, the application processor 1200 may read and decode the encoded image signals from the internal memory 1230 or the external memory 1400 and may display image data generated based on the decoded image signals. For example, the corresponding one among sub image processors 1212a, 1212b, and 1212c of the image processing device 1210 may perform decoding and may also perform image processing on the decoded image signal.

In the second operating mode, the plurality of camera modules 1100a, 1100b, and 1100c may generate image signals at a third speed (e.g., may generate image signals of a third frame rate lower than the first frame rate) and transmit the image signals to the application processor 1200. The image signals provided to the application processor 1200 may be signals that are not encoded. The application processor 1200 may perform image processing on the received image signals or may store the image signals in the internal memory 1230 or the external memory 1400.

The PMIC 1300 may supply powers, for example, power supply voltages to the plurality of camera modules 1100a, 1100b, and 1100c, respectively. For example, under control of the application processor 1200, the PMIC 1300 may supply a first power to the camera module 1100a through a power signal line PSLa, may supply a second power to the camera module 1100b through a power signal line PSLb, and may supply a third power to the camera module 1100c through a power signal line PSLc.

In response to a power control signal PCON from the application processor 1200, the PMIC 1300 may generate a power corresponding to each of the plurality of camera modules 1100a, 1100b, and 1100c and may adjust a level of the power. The power control signal PCON may include a power adjustment signal for each operating mode of the plurality of camera modules 1100a, 1100b, and 1100c. For example, the operating mode may include a low-power mode. In this case, the power control signal PCON may include information about a camera module operating in the low-power mode and a set power level. Levels of the powers respectively provided to the plurality of camera modules 1100a, 1100b, and 1100c may be identical to each other or may be different from each other. Also, a level of a power may be dynamically changed.

In an example embodiment, the image sensor 100 described with reference to FIGS. 1 to 15 may correspond to the image sensor 1142 of FIG. 17. The image sensor 1142 may adjust the remosaic settings based on the saturation level of pixel values. The image sensor 1142 may perform remosaic based on the remosaic settings and may perform crosstalk correction. In an example embodiment, the remosaic crosstalk correction may be performed sequentially or reversely. When the image sensor 1142 is implemented according to an example embodiment of the present disclosure, the quality of image data obtained by the application processor 1200 may be improved.

In the above embodiments, components according to the present disclosure are described using the terms "first", "second", "third", etc. However, the terms "first", "second", "third", etc. may be used to distinguish components from each other and do not limit the present disclosure. For example, the terms "first", "second", "third", etc. do not involve an order or a numerical meaning of any form.

In the above embodiments, components according to example embodiments of the present disclosure are referenced using blocks as shown in, for example, FIGS. 1, 16 and 17. These blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit, or circuits enrolled as an intellectual property (IP).

According to embodiments of the present disclosure, when pixel values sensed by pixels are saturated, an image sensor may adjust remosaic settings. Accordingly, an image sensor capable of correcting a crosstalk even when the pixel values are saturated, an operating method of the image sensor, and an electronic device including the image sensor are provided.

Each of the embodiments provided in the above description is not excluded from being associated with one or more features of another example or another embodiment also provided herein or not provided herein but consistent with the disclosure While the disclosure has been particularly shown and described with reference to embodiments thereof, it will be understood that various changes in form and details may be made therein without departing from the spirit and scope of the following claims.

What is claimed is:

1. An image sensor comprising:
    a pixel unit comprising a plurality of pixels, and configured to generate an analog signal using the plurality of pixels;
    a data converter configured to:
        receive the analog signal, and
        convert the analog signal into a digital signal; and
    at least one processor configured to:
        generate image data by performing crosstalk correction and remosaic on the digital signal;
        output the image data to an external device,
        receive image data information from the external device;
        determine a saturation ratio based on the image data information; and
        adjust settings of the remosaic based on the saturation ratio, wherein the at least one processor is further configured to:
    detect a plurality of mean pixel values of groups of pixel values on the image data, the plurality of mean pixel values corresponding to the plurality of pixels; and
    determine the saturation ratio based on the plurality of mean pixel values.

2. The image sensor of claim 1, wherein the at least one processor is further configured to:
    determine the saturation ratio by comparing the plurality of mean pixel values with a threshold value.

3. The image sensor of claim 2, wherein the at least one processor is further configured to:
    determine, as the saturation ratio, a ratio of a number of mean pixel values among the plurality of mean pixel values that are greater than the threshold value.

4. The image sensor of claim 1, wherein the image data information comprises information about a number of saturated pixel values among pixel values corresponding to the plurality of pixels, and
    wherein the at least one processor is further configured to:
        determine the saturation ratio based on the number of saturated pixel values included in the image data information.

5. The image sensor of claim 1, wherein the image data comprise a plurality of channel data respectively corresponding to a plurality of channels,
    wherein the image data information comprises a plurality of channel data information respectively corresponding to the plurality of channels, and
    wherein the at least one processor is further configured to:
        determine a plurality of first saturation ratios respectively corresponding to the plurality of channels.

6. The image sensor of claim 5, wherein the at least one processor is further configured to:
    adjust the settings of the remosaic based on a highest saturation ratio among the plurality of first saturation ratios.

7. The image sensor of claim 1, wherein the at least one processor is further configured to:
    adjust at least one of:
        a flatness threshold used to determine whether the image data are flat image data,
        a local flatness threshold used to determine a flat area of the image data, and
        a smoothing power used to smoothen the flat area of the image data.

8. The image sensor of claim 7, wherein the at least one processor is further configured to:
    increase at least one of the flatness threshold, the local flatness threshold, and the smoothing power as the saturation ratio increases.

9. The image sensor of claim 8, wherein the at least one processor is further configured to:
    increase at least two of the flatness threshold, the local flatness threshold, and the smoothing power by a same ratio as the saturation ratio increases.

10. The image sensor of claim 8, wherein the at least one processor is further configured to:
    increase at least two of the flatness threshold, the local flatness threshold, and the smoothing power by different ratios as the saturation ratio increases.

11. The image sensor of claim 1, wherein the at least one processor is further configured to:
    correct a crosstalk of saturated pixels among the plurality of pixels by adjusting the settings of the remosaic.

12. The image sensor of claim 11, wherein the at least one processor is further configured to:
    perform the crosstalk correction on unsaturated pixels among the plurality of pixels by applying a gain and an offset to pixel values of the unsaturated pixels.

13. An operating method of an image sensor comprising a plurality of pixels, the method comprising:
    receiving, at the image sensor, image data information from an external device;
    determining, at the image sensor, a saturation ratio of image data obtained by the image sensor from the image data information;
    adjusting, at the image sensor, remosaic settings based on the saturation ratio; and
    performing, at the image sensor, remosaic on the image data obtained by the image sensor based on the remosaic settings, wherein the image data information comprises information of image data of a previous frame output to the external device by the image sensor.

14. The method of claim 13, wherein the remosaic is performed on image data of a current frame based on the remosaic settings.

15. The method of claim 13, wherein the determining of the saturation ratio comprises:
    detecting a plurality of mean pixel values of groups of pixel values corresponding to the plurality of pixels;
    determining saturated groups among the groups of pixel values using a threshold value;
    determining a number of the saturated groups; and
    determining the saturation ratio based on the determined number of saturated groups.

16. The method of claim 13, wherein the determining of the saturation ratio comprises:
    determining a number of saturated pixels corresponding to saturated pixel values among the plurality of pixels; and
    determining the saturation ratio based on the determined number of saturated pixels.

17. An electronic device comprising:
    an image sensor comprising a plurality of pixels; and
    at least one processor configured to:
        generate image data information based on image data generated by the image sensor; and
        send the image data information to the image sensor,
    wherein the image sensor is configured to:
        determine a saturation ratio of the plurality of pixels from the image data information;
        correct a crosstalk of the plurality of pixels based on the saturation ratio in one of a first mode and a second mode,
        in the first mode, correct the crosstalk based on a gain and an offset, and
        in the second mode, correct the crosstalk based on the gain and the offset and by adjusting remosaic settings.

18. The electronic device of claim 17, wherein the image sensor is further configured to:
    enter the first mode based on the saturation ratio being smaller than a reference value; and
    enters the second mode based on the saturation ratio being greater than or equal to the reference value.

* * * * *